United States Patent
Fujiwara et al.

(10) Patent No.: US 9,475,126 B2
(45) Date of Patent: Oct. 25, 2016

(54) CHUCKING DEVICE AND CHUCKING METHOD FOR MACHINE TOOL

(71) Applicant: SMC Corporation, Chiyoda-ku (JP)

(72) Inventors: Atsushi Fujiwara, Moriya (JP); Junji Nishino, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 219 days.

(21) Appl. No.: 14/299,420

(22) Filed: Jun. 9, 2014

(65) Prior Publication Data

US 2015/0013145 A1    Jan. 15, 2015

(30) Foreign Application Priority Data

Jul. 10, 2013    (JP) .................................. 2013-144773

(51) Int. Cl.
  *B23Q 17/00*    (2006.01)
  *B23Q 7/00*    (2006.01)
  *B23B 31/10*    (2006.01)
  *B23B 31/30*    (2006.01)
  (Continued)

(52) U.S. Cl.
  CPC ............. *B23B 31/101* (2013.01); *B23B 31/30* (2013.01); *B23Q 3/12* (2013.01); *B23Q 3/18* (2013.01); *B23Q 17/2291* (2013.01); *B23B 2231/14* (2013.01); *B23B 2231/22* (2013.01); *Y10T 29/49998* (2015.01); *Y10T 279/1208* (2015.01)

(58) Field of Classification Search
  CPC ............ B23B 31/16212; B23B 31/30; B23B 31/16216; B23B 31/16287; B23B 31/16225; B23B 31/16291; B23B 31/101; B23B 2231/42; B23B 2231/22; B23B 2231/14; Y10T 279/19; Y10T 279/1906; Y10T 279/21; Y10T 279/1274; Y10T 279/1283; Y10T 279/26; Y10T 279/1208; Y10T 29/49998; B23Q 3/18; B23Q 17/2216; B23Q 17/2291
  USPC .............................................. 279/4.02, 4.04
  See application file for complete search history.

(56) References Cited

U.S. PATENT DOCUMENTS

| | | | | |
|---|---|---|---|---|
| 2,695,176 A | * | 11/1954 | Work | B23B 31/16216 279/119 |
| 3,166,336 A | * | 1/1965 | Goodrum | B23B 31/16212 279/123 |

(Continued)

FOREIGN PATENT DOCUMENTS

| | | | | |
|---|---|---|---|---|
| DE | 4014616 A1 | * | 11/1991 | ........... B23B 31/101 |
| DE | 102008020489 A1 | * | 10/2009 | ............. B23Q 7/043 |

(Continued)

OTHER PUBLICATIONS

Machine English translation of DE 4014616 A1 published Nov. 1991.*

*Primary Examiner* — Essama Omgba
(74) *Attorney, Agent, or Firm* — Oblon, McClelland, Maier & Neustadt, L.L.P.

(57) ABSTRACT

In a chucking device and a chucking method for a machine tool which grip a workpiece that serves as a target object to be processed by the machine tool, a first cylinder and a second cylinder are controlled based on the position of a piston of the first cylinder detected by a length measuring sensor, and the position of a piston of the second cylinder detected by a length measuring sensor. In this manner, the workpiece is gripped by respective gripping members at a predetermined position, i.e., the axial center, of a chuck main body.

14 Claims, 9 Drawing Sheets

(51) Int. Cl.
*B23Q 3/12* (2006.01)
*B23Q 3/18* (2006.01)
*B23Q 17/22* (2006.01)

(56) References Cited

U.S. PATENT DOCUMENTS

| | | | | |
|---|---|---|---|---|
| 4,080,716 | A * | 3/1978 | vom Dorp | B23B 31/302 269/20 |
| 4,443,021 | A * | 4/1984 | Buchholz | B23Q 3/16 279/111 |
| 4,909,521 | A * | 3/1990 | Ovanin | B23Q 1/0009 279/111 |
| 6,178,837 | B1 | 1/2001 | Nagai et al. | |
| 6,428,070 | B1 * | 8/2002 | Takanashi | B25B 5/06 294/119.1 |
| 6,478,310 | B1 * | 11/2002 | Azami | B23B 31/1622 279/4.02 |
| 6,679,503 | B2 * | 1/2004 | Yamazaki | B23B 31/16204 269/266 |
| 7,555,844 | B2 * | 7/2009 | Wisniewski | B23B 31/30 33/1 M |
| 7,635,154 | B2 * | 12/2009 | Maffeis | B25J 15/0266 294/119.1 |
| 7,654,178 | B2 * | 2/2010 | Hall | B23B 31/101 279/126 |
| 8,297,097 | B2 * | 10/2012 | Mishima | B21D 22/16 72/112 |
| 2002/0053774 | A1 | 5/2002 | Yamazaki et al. | |
| 2004/0094910 | A1 * | 5/2004 | Rehm | B23B 31/16254 279/126 |
| 2008/0157487 | A1 * | 7/2008 | Hall | B23B 31/101 279/4.12 |
| 2009/0007769 | A1 | 1/2009 | Matsumoto et al. | |
| 2009/0139292 | A1 * | 6/2009 | Mishima | B21D 41/045 72/62 |

FOREIGN PATENT DOCUMENTS

| | | | |
|---|---|---|---|
| JP | 3-41124 | | 8/1991 |
| JP | 5-24237 | U | 3/1993 |
| JP | 7-9532 | U | 2/1995 |
| JP | 7-110005 | | 4/1995 |
| JP | 7-214339 | | 8/1995 |
| JP | 10-184844 | | 7/1998 |
| JP | 2002172504 | A * | 6/2002 |
| JP | 2003-159606 | | 6/2003 |
| JP | 2008-249025 | | 10/2008 |
| KR | 20010066631 | A * | 7/2001 |
| KR | 101289554 | B1 * | 7/2013 |
| KR | 101336538 | B1 * | 12/2013 |

* cited by examiner

CHUCKING DEVICE AND CHUCKING METHOD FOR MACHINE TOOL

CROSS-REFERENCE TO RELATED APPLICATION

This application is based upon and claims the benefit of priority from Japanese Patent Application No. 2013-144773 filed on Jul. 10, 2013, the contents of which are incorporated herein by reference.

BACKGROUND OF THE INVENTION

1. Field of the Invention

The present invention relates to a chucking device and a chucking method for a machine tool for gripping a workpiece as a target object to be processed by the machine tool.

2. Description of the Related Art

In a machine tool such as a laser processing machine or the like, a predetermined machining process (e.g., laser machining) is carried out on a workpiece, which serves as a target object to be processed, in a state in which the workpiece is retained by a chucking device. In Japanese Laid-Open Patent Publication No. 2003-159606, it is disclosed that using a chucking device having a plurality of cylinders, a workpiece is retained by distal ends of piston rods of such cylinders.

Further, as disclosed in Japanese Laid-Open Utility Model Publication No. 05-024237, a fixed block and an air cylinder are provided with a workpiece that is placed on a base plate being interposed therebetween. A piston rod of the air cylinder is displaced in a direction toward the fixed block, whereby the workpiece is supported by being pressed against the fixed block.

SUMMARY OF THE INVENTION

Incidentally, in the case that a workpiece is gripped by being pressed on both sides of the workpiece using two cylinders, if the workpiece is simply pressed on both sides thereof under the same pressure, there is a concern that positional shifting of the workpiece may occur depending on how the pressure is applied with respect to the workpiece.

Thus, by applying the technique of Japanese Laid-Open Utility Model 05-024237, it may be considered to position the workpiece using one of the cylinders, and then to press and grip the workpiece with the other cylinder. In this case, with the machine tool, since a predetermined machining process (e.g., a machining process carried out while the chucking device is rotated) is carried out in a state in which the workpiece is gripped, it is desirable for the workpiece to be gripped in a state in which the axial center of a chuck main body that makes up the chucking device coincides with the center position of the workpiece.

However, if variations exist in the shapes of workpieces, or if the center position of the workpiece becomes shifted with respect to the axial center, the workpiece cannot be gripped properly at the axial center of the chuck main body.

The present invention aims to solve the aforementioned problems, and has the object of providing a chucking device and a chucking method for a machine tool, which is capable of gripping a workpiece without causing positional shifting of the workpiece.

Further, an object of the present invention is to provide a chucking device and a chucking method for a machine tool, which is capable of gripping a workpiece in a state in which a center position thereof coincides substantially with an axial center of a chuck main body, even if there is a variance in the shape of the workpiece, or if the center position of the workpiece is shifted with respect to the axial center of the chuck main body.

The present invention relates to a chucking device and a chucking method for a machine tool, for gripping a workpiece that serves as a target object to be processed by the machine tool.

In addition, the present invention includes the following first through sixteenth features.

More specifically, according to the first feature, the chucking device for a machine tool includes a chuck main body, a first cylinder, a second cylinder, a first position detecting sensor, a second position detecting sensor, and a control mechanism.

In this case, the first cylinder is attached to the chuck main body, and the workpiece is positioned by displacement of a first piston rod, which is connected to a first piston, in a direction toward the workpiece. Further, the second cylinder is attached to the chuck main body, and the positioned workpiece is pressed by displacement of a second piston rod, which is connected to a second piston, in a direction toward the workpiece.

The first position detecting sensor detects a position of the first piston. The second position detecting sensor detects a position of the second piston. Additionally, the control mechanism controls the first cylinder and the second cylinder based on the position of the first piston and the position of the second piston, which have been detected, whereby the workpiece is gripped at a predetermined position of the chuck main body by the first piston rod and the second piston rod.

According to the first feature, the workpiece is positioned by the first cylinder, and by pressing the positioned workpiece using the second cylinder, the workpiece, which has been placed properly on the chuck main body, is gripped. Additionally, the control mechanism controls the first cylinder and the second cylinder based on the position of the first piston and the position of the second piston, which have been detected, and the workpiece is gripped at a predetermined position of the chuck main body by the first piston rod and the second piston rod.

Owing to the above features, the workpiece can be gripped without the occurrence of positional shifting of the workpiece. Further, even if variations exist in the shapes, etc. of the workpieces, or if the center position of the workpiece becomes shifted with respect to the axial center of the chuck main body, the workpiece can be gripped under a condition in which the center position of the workpiece substantially coincides with the axial center of the chuck main body.

In the second feature of the present invention, the control mechanism further includes a first cylinder controller that displaces the first piston rod by controlling the first cylinder, and a second cylinder controller that displaces the second piston rod by controlling the second cylinder.

In this case, the first piston rod is displaced toward the axial center of the chuck main body in accordance with a control performed by the first cylinder controller to thereby position the workpiece at a predetermined position on the chuck main body. Further, the second piston rod is displaced toward the axial center of the chuck main body in accordance with a control performed by the second cylinder controller to thereby press the workpiece.

In this manner, based on the detected position of the first piston, the first cylinder controller displaces the first piston rod toward the axial center. On the other hand, based on the detected position of the second piston, the second cylinder controller displaces the second piston rod toward the axial center.

Owing to the above features, the workpiece can be gripped at the axial center position without the occurrence of positional shifting of the workpiece. Further, even if variations exist in the shapes, etc. of the workpieces, or if the center position of the workpiece becomes shifted with respect to the axial center of the chuck main body, the workpiece can be gripped in such a manner that the center position of the workpiece is made to coincide with the axial center of the chuck main body.

According to the third feature, the control mechanism further includes a positional shift calculating unit, which calculates an amount of positional shift between the axial center and a center position of the workpiece that is gripped by the first piston rod and the second piston rod, based on the position of the first piston and the position of the second piston, which have been detected. In this case, the first cylinder controller displaces the first piston rod based on the amount of positional shift, and the second cylinder controller displaces the second piston rod based on the amount of positional shift, whereby the center position of the workpiece is corrected to the axial center.

In this manner, even if variations exist in the shapes, etc. of the workpieces, or if the center position of the workpiece is placed in a shifted condition with respect to the axial center of the chuck main body, since the center position of the workpiece can be corrected automatically to the axial center such that the amount of positional shift is zero, the workpiece can reliably be gripped at the axial center.

In the fourth feature of the invention, the control mechanism further includes an end position calculating unit, which calculates the position of an end of the first piston rod based on the detected position of the first piston, and calculates the position of an end of the second piston rod based on the detected position of the second piston.

In this case, the first cylinder controller displaces the first piston rod toward the axial center, until the calculated position of the end of the first piston rod reaches a first position configured to position the workpiece. On the other hand, the second cylinder controller displaces the second piston rod toward the axial center, until the calculated position of the end of the second piston rod reaches a second position configured to press the workpiece.

Consequently, the first cylinder controller and the second cylinder controller, for example, by means of a servo control, are capable of displacing the first piston rod and the second piston rod, respectively, to arrive at the first position and the second position, and can reliably grip the workpiece at the axial center position. Further, in the case that the size of the workpiece is known beforehand, and the workpiece is to be gripped at the axial center position, the first position and the second position can be specified beforehand from the size of the workpiece and the position of the axial center. As a result, the first piston rod can easily be displaced to the first position, and the second piston rod can easily be displaced to the second position.

According to the fifth feature, the first cylinder controller displaces the first piston rod toward the axial center while adjusting a velocity of the first piston rod, based on the first position and the position of the end of the first piston rod. Further, the second cylinder controller displaces the second piston rod toward the axial center while adjusting a velocity of the second piston rod, based on the second position and the position of the end of the second piston rod.

Consequently, for example, by means of a servo control, after the first piston rod and the second piston rod have been displaced at high velocity to respective locations in the vicinity of the workpiece, the first piston rod and the second piston rod are reduced in velocity just before the workpiece, whereby the end of the first piston rod and the end of the second piston rod can be placed in contact with the workpiece in a state in which the velocity thereof is zero.

As a result, the end of the first piston rod and the end of the second piston rod can be brought into contact lightly (softly) against the workpiece, so that shocks to the workpiece can be suppressed when the workpiece is positioned and gripped.

According to the sixth feature, the control mechanism further includes a lock-up unit that fixes and holds the first piston rod when the position of the end of the first piston rod reaches the first position.

Owing thereto, when the workpiece is gripped, even if a pressing force from the second piston rod is transmitted to the first piston rod through the workpiece, unwanted displacement of the first piston rod by the pressing force can be prevented.

More specifically, the pressing force behaves as an external force (disturbance) when the first piston rod positions the workpiece. Accordingly, by the lock-up unit fixing and holding the first piston rod, the influence of such a disturbance can be avoided.

According to the seventh feature of the present invention, the first cylinder controller may maintain the position of the end of the first piston rod at the first position, after the position of the end has reached the first position.

More specifically, in the case that the lock-up unit is not provided together with the first cylinder, by maintaining the position of the end of the first piston rod at the first position through a servo control, the positioned state of the workpiece by the first cylinder can be retained.

According to the eighth feature, a gripping force detecting sensor, which detects a gripping force applied to the workpiece by the first piston rod and the second piston rod, is disposed on an end of the first piston rod that contacts the workpiece and/or an end of the second piston rod that contacts the workpiece.

In this manner, by directly detecting the gripping force on the workpiece, the degree to which the gripping force is applied with respect to the workpiece can be detected with high precision. Consequently, with the control mechanism, by the first cylinder control unit and the second cylinder control unit controlling the first cylinder and the second cylinder based on the detected gripping force, the workpiece can be gripped with an appropriate gripping force. As a gripping force detecting sensor, for example, a pressure sensor such as a load cell may be used.

In the ninth feature, the first cylinder and the second cylinder preferably are fluid pressure cylinders. Accordingly, the first cylinder controller may include a pressure fluid supply device that displaces the first piston rod by supplying a pressure fluid to the first cylinder. Further, the second cylinder controller may include a pressure fluid supply device that displaces the second piston rod by supplying a pressure fluid to the second cylinder.

According to the tenth feature of the present invention, a first pressure chamber and a second pressure chamber, which are separated by the first piston, are formed in the interior of the first cylinder, and a third pressure chamber and a fourth pressure chamber, which are separated by the second piston, are formed in the interior of the second cylinder. In this case, the chucking device for a machine tool further includes a first pressure sensor that detects a first pressure of the first pressure chamber, a second pressure sensor that detects a second pressure of the second pressure chamber, a third pressure sensor that detects a third pressure of the third pressure chamber, and a fourth pressure sensor that detects a fourth pressure of the fourth pressure chamber.

In addition, the control mechanism may further include a gripping force calculating unit that calculates a gripping force applied to the workpiece by the first piston rod and the second piston rod, based on the detected first pressure and the detected second pressure, and/or the detected third pressure and the detected fourth pressure.

More specifically, in the case that high precision in respect to the gripping force is not required, the gripping force may be estimated based on the first pressure and the second pressure and/or the third pressure and the fourth pressure. In this case as well, with the control mechanism, by the first cylinder control unit and the second cylinder control unit controlling the first cylinder and the second cylinder based on the estimated gripping force, the workpiece can be gripped with an appropriate gripping force.

According to the eleventh feature, the gripping force calculating unit may calculate, as a gripping force target value, a gripping force corresponding to a weight of the workpiece. In this case, the first cylinder controller may control the first pressure and the second pressure such that the calculated gripping force becomes the gripping force target value. Further, the second cylinder controller may control the third pressure and the fourth pressure such that the calculated gripping force becomes the gripping force target value.

In this manner, assuming that the first through fourth pressures are controlled based on the weight of the workpiece, and the first piston rod and the second piston rod are displaced, application of an excessive gripping force with respect to a lightweight workpiece, or application of an insufficient gripping force with respect to a heavy workpiece can be prevented.

In the twelfth feature of the present invention, the first cylinder and the second cylinder preferably are attached to the chuck main body, in such a way that a direction of a positioning force that acts on the workpiece from the first piston rod, and a direction of a pressing force that acts on the workpiece from the second piston rod lie on substantially the same axis.

Consequently, since the positioning force and the pressing force are applied along the same single axis with respect to the workpiece, positional shifting of the workpiece is prevented while the workpiece can also be gripped highly efficiently.

In the thirteenth feature, the first cylinder and the second cylinder are attached to the chuck main body in confronting relation to each other with the axial center sandwiched therebetween.

Accordingly, positional shifting of the workpiece is prevented while the workpiece can be gripped reliably at the position of the axial center.

In the fourteenth feature, in the case that one first cylinder and one second cylinder, which are disposed in confronting relation to each other sandwiching the axial center therebetween, form one pair, plural pairs of the cylinders are attached to the chuck main body at a predetermined angular interval in a radiating manner with respect to the axial center.

Accordingly, positional shifting of the workpiece is certainly prevented, while the workpiece can be gripped reliably at the position of the axial center.

In the fifteenth feature of the present invention, in the case that at least three of the first cylinders and the second cylinders in total are attached at a predetermined angular interval in a radiating manner with respect to the axial center, the first cylinders and the second cylinders are attached to the chuck main body in such a manner that the direction of a combined positioning force and the direction of a combined pressing force lie on substantially the same axis.

Even if the first cylinder and the second cylinder are not disposed in confronting relation to each other sandwiching the axial center therebetween, as long as the directions of the combined positioning force and the combined pressing force lie substantially on the same single axis, positional shifting of the workpiece can be prevented, and the workpiece can be gripped at the position of the axial center.

According to the sixteenth feature of the present invention, a chucking method for a machine tool includes a first step and a second step.

In the first step, a first piston rod connected to a first piston of a first cylinder that is attached to a chuck main body, is displaced in a direction toward the workpiece to thereby position the workpiece, in a state in which the workpiece is placed on the chuck main body.

In the second step, a second piston rod connected to a second piston of a second cylinder that is attached to the chuck main body is displaced in a direction toward the workpiece to thereby press the positioned workpiece.

In addition, in the second step, based on the position of the first piston detected by a first position detecting sensor, and the position of the second piston detected by a second position detecting sensor, a control mechanism controls the first cylinder and the second cylinder such that the workpiece is gripped at a predetermined position of the chuck main body by the first piston rod and the second piston rod.

According to the sixteenth feature, in the same manner as the first feature, the workpiece is positioned by the first cylinder, and by pressing the positioned workpiece using the second cylinder, the workpiece, which has been placed properly on the chuck main body, is gripped. Further, the control mechanism controls the first cylinder and the second cylinder based on the position of the first piston and the position of the second piston, which have been detected, and the workpiece is gripped at a predetermined position of the chuck main body by the first piston rod and the second piston rod.

As a result, the workpiece can be gripped without positional shifting of the workpiece. Further, even if variations exist in the shapes, etc. of the workpieces, or if the center position of the workpiece becomes shifted with respect to the axial center of the chuck main body, the workpiece can be gripped under a condition in which the center position of the workpiece substantially coincides with the axial center of the chuck main body.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a chucking device for a machine tool according to the present invention, in relation to a chucking method for the machine tool, will be described in detail below with reference to the accompanying drawings.

[Configuration of Chucking Device for a Machine Tool]

Figure 1:
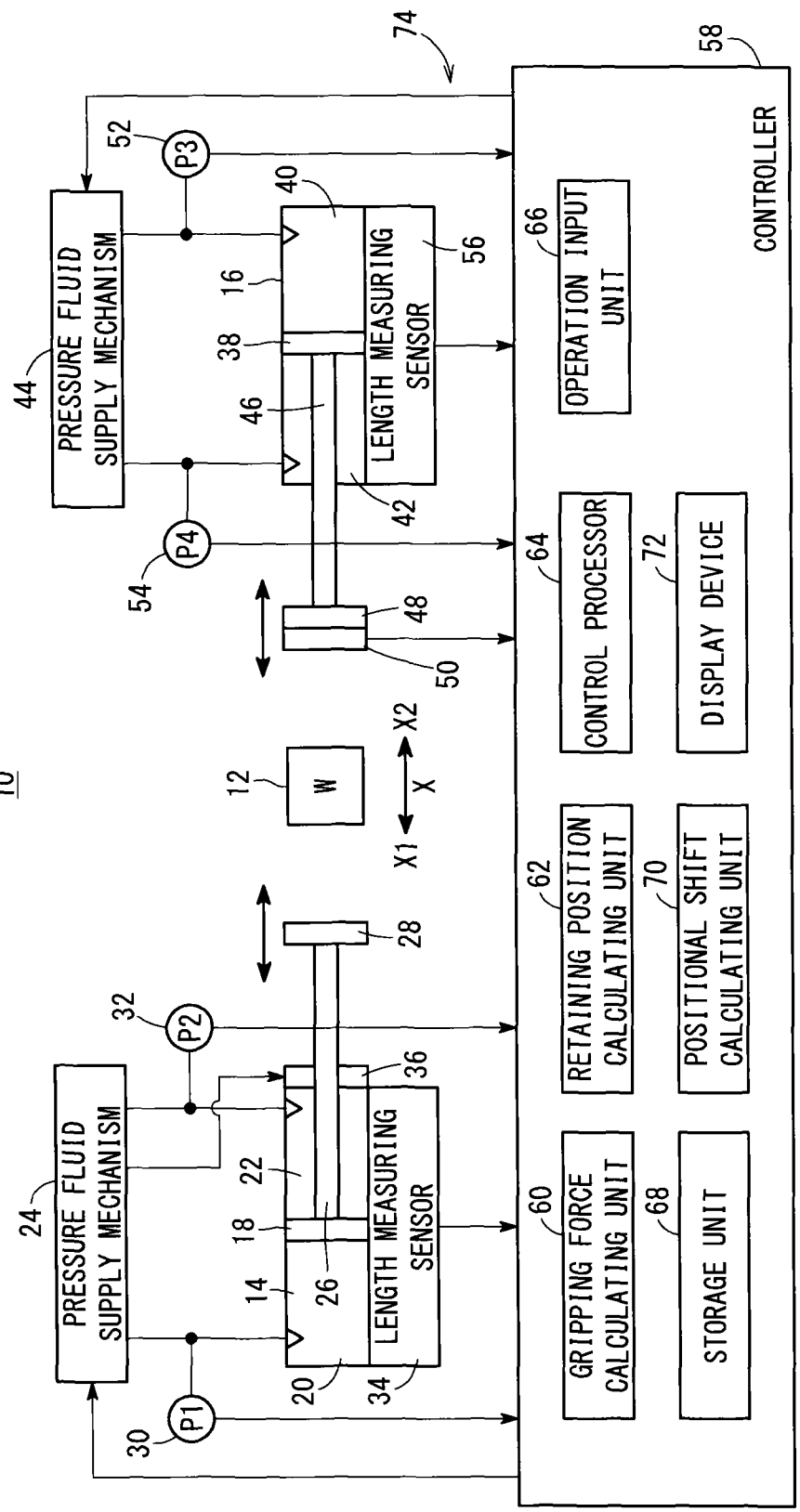
FIG. 1 is a configuration diagram of a chucking device according to an embodiment of the present invention.

As shown in FIG. 1, a chucking device 10 for a machine tool according to the present embodiment (hereinafter referred to as a chucking device 10 according to the present embodiment) serves to grip a workpiece 12, which is a target object to be processed by a machine tool such as a laser processing machine or the like, using a first cylinder 14 and a second cylinder 16, which are disposed on both left and right sides (in the X1 direction and the X2 direction of FIG. 1) of the workpiece 12.

More specifically, the interior of the first cylinder 14, which is a fluid pressure cylinder such as an air cylinder or the like, is partitioned into a first pressure chamber 20 on a side in the direction of the arrow X1, and a second pressure chamber 22 on a side in the direction of the arrow X2 by a piston (first piston) 18. In this case, when pressure fluid is supplied to the first pressure chamber 20 from a pressure fluid supply mechanism (first cylinder controller, pressure fluid supply device) 24, and pressure is discharged to the exterior from the second pressure chamber 22 through the pressure fluid supply mechanism 24, the piston 18, and a piston rod (first piston rod) 26 connected to the piston 18 are displaced in the direction of the arrow X2. A pad-shaped gripping member 28 is disposed on an end in the direction of the arrow X2 of the piston rod 26. The workpiece 12 is positioned by the gripping member 28 coming into contact with the workpiece 12.

A first pressure P1 of the first pressure chamber 20 is detected by a pressure sensor (first pressure sensor) 30. A second pressure P2 of the second pressure chamber 22 is detected by a pressure sensor (second pressure sensor) 32. The position of the piston 18 along the X direction is detected by a length measuring sensor (first position detecting sensor) 34.

The length measuring sensor 34, for example, by applying the technique disclosed in Japanese Laid-Open Patent Publication No. 10-184844, may detect a magnetic flux from a non-illustrated magnet provided on the piston 18, and may output a signal (a signal responsive to the present position of the piston 18) corresponding to the detected magnetic flux. Alternatively, by applying the technique disclosed in Japanese Laid-Open Patent Publication No. 2008-249025, a non-illustrated piston rod may be provided that extends from the piston 18 into the first pressure chamber 20, and the position of the piston 18 may be detected indirectly by detecting the position of the piston rod.

Further, a lock-up mechanism (lock-up unit) 36, which fixes and holds the piston rod 26 when the gripping member 28 comes into contact with the workpiece 12 and positions the workpiece 12, is provided on the first cylinder 14. The lock-up mechanism 36, for example, by applying the technique disclosed in Japanese Utility Model Publication No. 03-041124, may fix and hold the piston rod 26 as a result of a pressure fluid being supplied from the pressure fluid supply mechanism 24.

Further, in the case that the workpiece 12 is to be released from the positioned state, the piston 18, the piston rod 26, and the gripping member 28 may be displaced integrally in the direction of the arrow X1, by pressure fluid being supplied from the pressure fluid supply mechanism 24 to the second pressure chamber 22, and pressure fluid being discharged to the exterior from the first pressure chamber 20 through the pressure fluid supply mechanism 24.

On the other hand, the second cylinder 16, which is a fluid pressure cylinder such as an air cylinder or the like, has substantially the same structure as the first cylinder 14. The interior of the second cylinder 16 is partitioned into a third pressure chamber 40 on a side in the direction of the arrow X2, and a fourth pressure chamber 42 on a side in the direction of the arrow X1 by a piston (second piston) 38. In this case, when pressure fluid is supplied to the third pressure chamber 40 from a pressure fluid supply mechanism (second cylinder controller, pressure fluid supply device) 44, and pressure is discharged to the exterior from the fourth pressure chamber 42 through the pressure fluid supply mechanism 44, a piston 38, and a piston rod (second piston rod) 46 connected to the piston 38 are displaced in the direction of the arrow X1.

A pad-shaped gripping member 48 is attached to an end in the direction of the arrow X1 of the piston rod 46. In this case, assuming the workpiece 12 has been positioned by the gripping member 28, the other gripping member 48 comes into contact against the workpiece 12, and presses the workpiece 12 in the direction of the arrow X1, whereby the workpiece can be gripped by the gripping members 28, 48.

Further, a load cell (gripping force detecting sensor) 50, which functions as a pressure sensor, is mounted on the gripping member 48 in confronting relation to the workpiece 12. When the gripping member 48 comes in contact with and is pressed against the workpiece 12 in the direction of the arrow X1, the load cell 50 detects the pressing force applied to the workpiece 12 from the gripping member 48 in the direction of the arrow X1, or stated otherwise, detects the gripping force applied to the workpiece 12 from the gripping members 28, 48.

The load cell 50 may be disposed on the gripping member 28. In this case, the load cell 50 that is provided on the gripping member 28 detects, as a gripping force with respect to the workpiece 12, the pressing force that is received through the workpiece 12 from the gripping member 48.

A third pressure P3 of the third pressure chamber 40 is detected by a pressure sensor (third pressure sensor) 52. A fourth pressure P4 of the fourth pressure chamber 42 is detected by a pressure sensor (fourth pressure sensor) 54. The position of the piston 38 along the X direction is detected by a length measuring sensor (second position detecting sensor) 56. The length measuring sensor 56, similar to the length measuring sensor 34, for example, detects a magnetic flux from a non-illustrated magnet provided on the piston 38, and outputs a signal (a signal responsive to the present position of the piston 38) corresponding to the detected magnetic flux.

Further, in the case that the workpiece 12 is to be released from the pressed state, the piston 38, the piston rod 46, the gripping member 48, and the load cell 50 may be displaced integrally in the direction of the arrow X2, by pressure fluid being supplied from the pressure fluid supply mechanism 44 to the fourth pressure chamber 42, and pressure fluid being discharged to the exterior from the third pressure chamber 40 through the pressure fluid supply mechanism 44.

Further, in FIG. 1, although a case has been shown in which the first cylinder 14 and the second cylinder 16 are fluid pressure cylinders having substantially the same structure, the first cylinder 14 and the second cylinder 16 may have mutually different structures, respectively.

The chucking device 10 further includes a controller 58. The controller 58 controls the first cylinder 14 and the second cylinder 16, or controls activation and deactivation of the lock-up mechanism 36, by supplying predetermined control signals to the pressure fluid supply mechanisms 24, 44, based on the present positions of the pistons 18, 38 as detected by the length measuring sensors 34, 56, the gripping force detected by the load cell 50, and/or the first through fourth pressures P1 through P4 detected by the respective pressure sensors 30, 32, 52, 54.

The controller 58 includes a gripping force calculating unit 60, a retaining position calculating unit (end position calculating unit) 62, a control processor 64, an operation input unit 66, a storage unit 68, a positional shift calculating unit 70, and a display device 72. The functions of the controller 58 will be described in detail later. Further, a control mechanism 74 is constituted such that, based on inputs from each of the sensors 30, 32, 34, 52, 54, 56 and the load cell 50, the first cylinder 14 and the second cylinder 16 are controlled by the controller 58 and the pressure fluid supply mechanisms 24, 44, and the workpiece 12 is gripped by the gripping members 28, 48.

Figure 2:
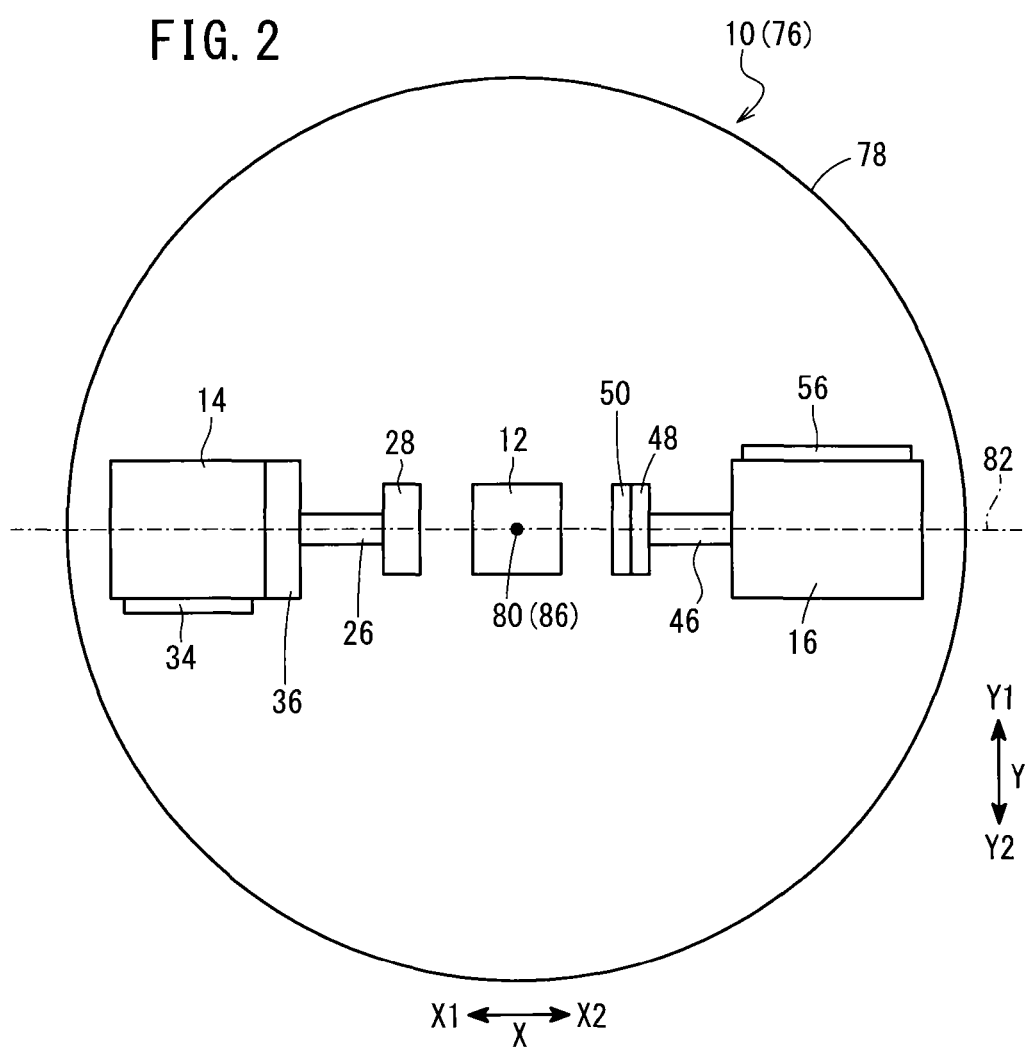
FIG. 2 is a structural drawing showing a first example of the chucking device of FIG. 1.
Figure 3:
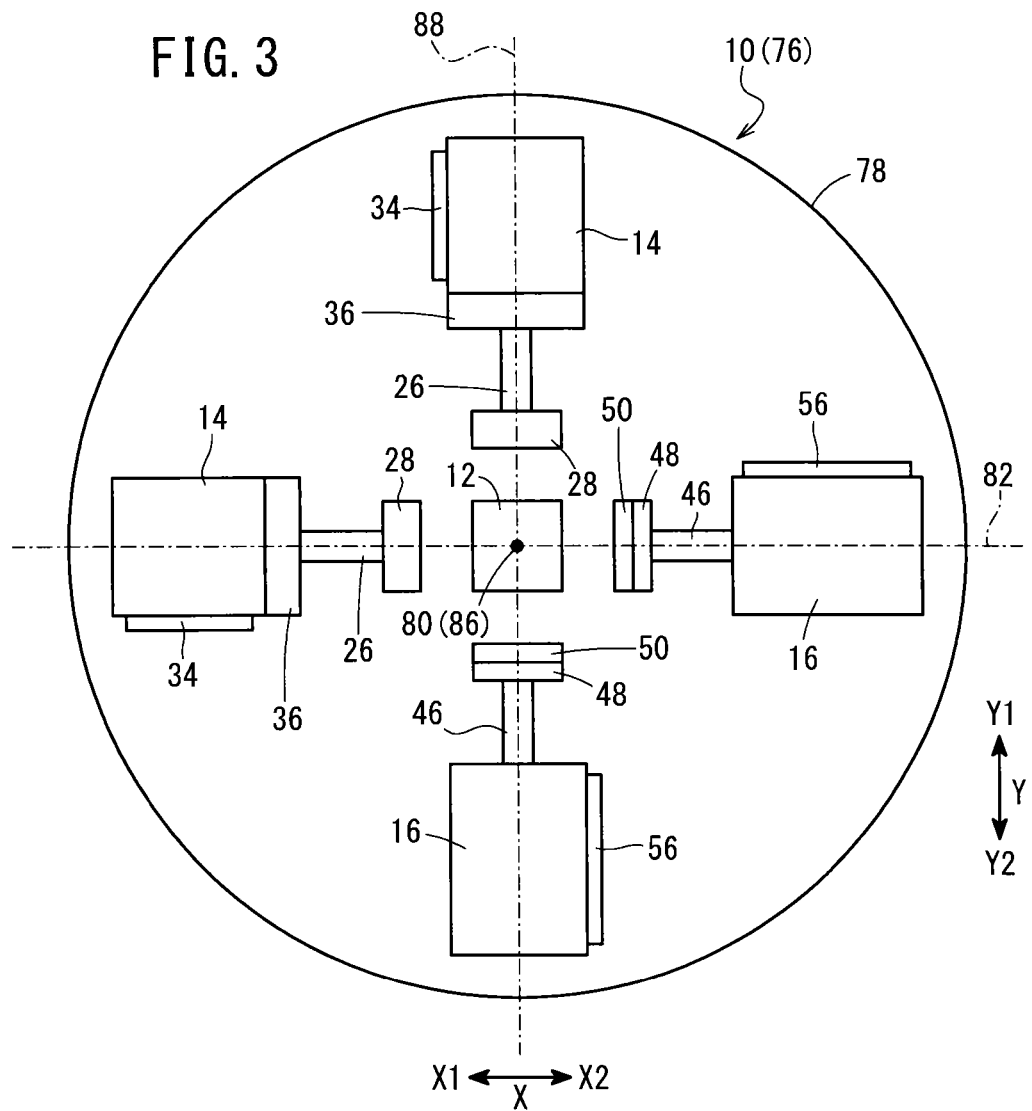
FIG. 3 is a structural drawing showing a second example of the chucking device of FIG. 1.
Figure 4:
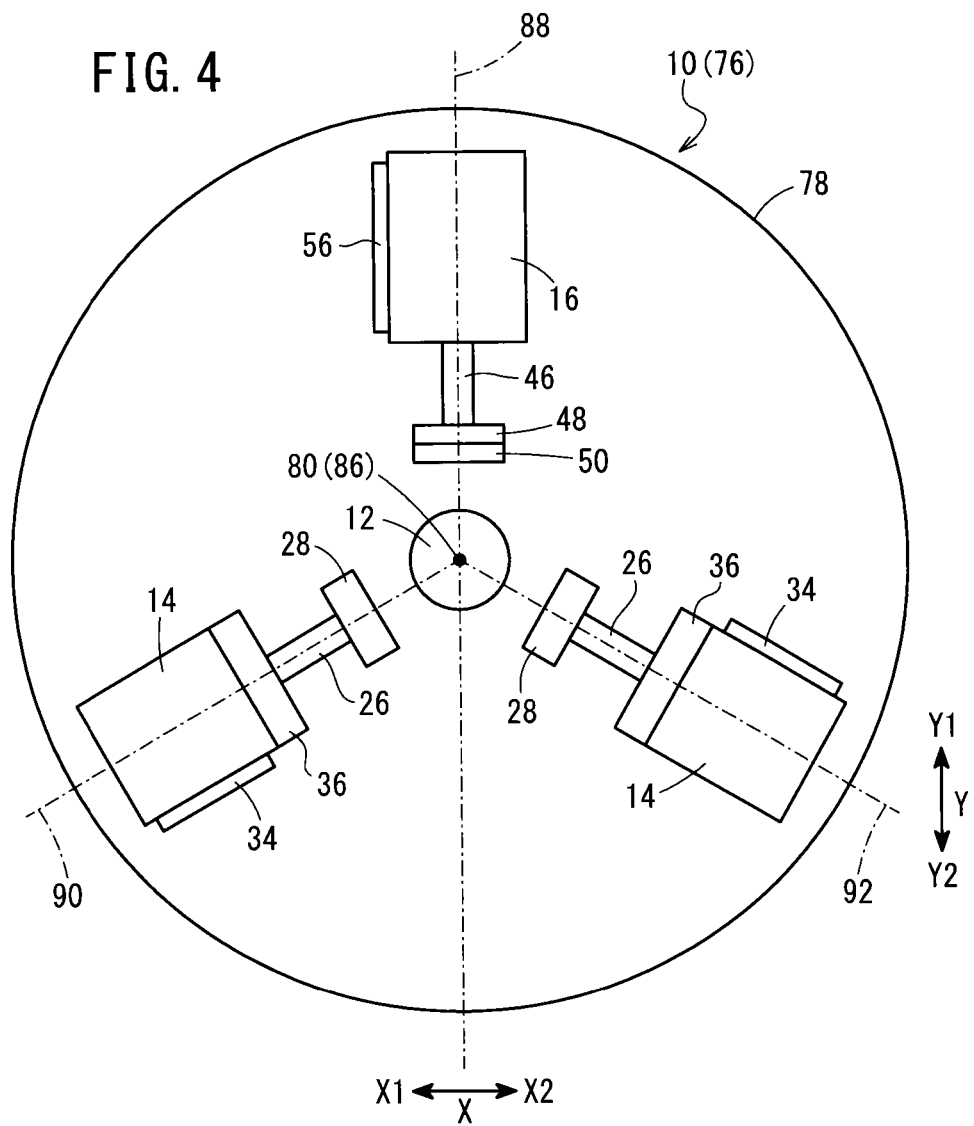
FIG. 4 is a structural drawing showing a third example of the chucking device of FIG. 1.

FIGS. 2 through 4 are structural diagrams showing detailed configurations (first through third examples) of a case in which the chucking device 10 according to the present embodiment is applied to a machine tool 76.

In the first example of FIG. 2, the chucking device 10 includes a cylindrical chuck main body 78. In this case, the first cylinder 14 and the second cylinder 16 are attached to the chuck main body 78 on an axial line 82 along the x-axis passing through an axial center 80 of the chuck main body 78, such that the first cylinder 14 and the second cylinder 16 confront one another (are disposed symmetrically with respect to the axial center 80) sandwiching the axial center 80 therebetween. Further, the workpiece 12 is mounted on the chuck main body 78 such that a center position 86 of the workpiece 12 coincides with the position of the axial center 80.

Therefore, in the first example of FIG. 2, when the piston rod 26 and the gripping member 28 are displaced along the axial line 82 in the X2 direction toward the axial center 80 and the center position 86, the gripping member 28 contacts the side surface of the workpiece 12 in the X1 direction, and is capable of positioning the workpiece 12.

On the other hand, when the piston rod 46, the gripping member 48, and the load cell 50 are displaced along the axial line 82 in the X1 direction toward the axial center 80 and the center position 86, the gripping member 48 and the load cell 50 come into contact with the side surface of the workpiece 12 in the X2 direction, and are capable of pressing the workpiece 12. As a result, by operation of the gripping members 28, 48, a gripping force is made to act in the X direction with respect to the workpiece 12, so that the workpiece 12 can be gripped at the position of the axial center 80.

The second example of FIG. 3 differs from the first example in that, in the case that one first cylinder 14 and one second cylinder 16, which are positioned on the axial line 82 in the X direction, are considered as one pair, another first cylinder 14 and another second cylinder 16 are attached as another pair to the chuck main body 78 on an axial line 88 along the Y direction passing through the axial center 80, in confronting relation to each other sandwiching the axial center 80 therebetween. Accordingly, in the second example, two pairs of cylinders are attached to the chuck main body 78 in a mutually perpendicular arrangement. Further, on the chuck main body 78, the respective first cylinders 14 and the respective second cylinders 16 are attached in a radiating manner with respect to the axial center 80 and the center position 86.

Therefore, with the second example of FIG. 3, the one pair of cylinders arranged on the axial line 82 grips the workpiece 12 along the X direction, whereas the other pair of cylinders arranged on the axial line 88 grips the workpiece 12 along the Y direction.

The third example of FIG. 4 shows an arrangement in which a cylindrically shaped workpiece 12 is disposed at the position of the axial center 80, such that the axial center 80 and the center position 86 of the workpiece 12 substantially coincide with each other.

In this case, on the chuck main body 78, the first cylinders 14 and the second cylinder 16, which include three cylinders in total, are arranged in a radiating manner about the axial center 80 and the center position 86, at a predetermined angular interval (an interval of 120° as shown in FIG. 4).

More specifically, on the chuck main body 78, the second cylinder 16 is disposed at a location on the axial line 88 on a side in the Y1 direction upwardly of the axial center 80 and the center position 86. On the other hand, on the chuck main body 78, one first cylinder 14 is arranged on an axial line 90, which is rotated by −120° in a counterclockwise direction with respect to the axial line 88. Further, on the chuck main body 78, another first cylinder 14 is arranged on an axial line 92, which is rotated by +120° in a clockwise direction with respect to the axial line 88.

When the piston rods 26 and the gripping members 28 of the first cylinders 14 are displaced at equal strokes in directions along the axial lines 90, 92 toward the axial center 80 and the center position 86, the respective gripping members 28 serve to position the workpiece 12. In this case, positioning forces from the respective gripping members 28 act on the workpiece 12 along the axial lines 90, 92. As noted previously, the respective gripping members 28 are displaced by equal strokes, and the axial lines 90, 92 define axial lines that are rotated by the same angular amount with respect to the axial line 88. Therefore, a combined force, which is obtained by combining the positioning forces applied to the workpiece 12 from the gripping members 28, makes up a force in a direction along the axial line 88.

On the other hand, when the gripping member 48 and the load cell 50 of the second cylinder 16 are displaced along the axial line 88 in a direction toward the axial center 80 and the center position 86, the gripping member 48 and the load cell 50 come into contact with the workpiece 12 and can press the workpiece 12. In this case, a pressing force from the gripping member 48 acts on the workpiece 12 along the axial line 88.

Consequently, the workpiece 12 is gripped at a predetermined gripping force, by the combined force along the axial line 88, which is made up of the positioning forces that act on the workpiece 12 from the gripping members 28, and the pressing force along the axial line 88, which is applied to the workpiece 12 from the gripping member 48.

Further, in the first through third examples, as shown in FIGS. 2 through 4, assuming that the direction of the positioning force (or the combined force of the positioning forces) that acts on the workpiece 12 from the gripping member(s) 28, and the direction of the pressing force (or the combined force of the pressing forces) that acts on the workpiece 12 from the gripping member(s) 48 lie on substantially the same axis, the workpiece 12 can be gripped at the axial center 80, in a state in which the axial center 80 of the chuck main body 78 and the center position 86 of the workpiece 12 coincide with each other.

Accordingly, with the second example of FIG. 3, in the case that one first cylinder 14 and one second cylinder 16, which are disposed in confronting relation sandwiching the axial center 80 therebetween, form one pair, plural pairs of the cylinders can be attached to the chuck main body 78 at a predetermined angular interval in a radiating manner with respect to the axial center 80.

Further, with the third example of FIG. 4, at least three of the first cylinders 14 and the second cylinders 16 in total can be attached to the chuck main body 78 at a predetermined angular interval in a radiating manner with respect to the axial center 80. In this case, the first cylinders 14 and the second cylinders 16 may be attached to the chuck main body 78 in such a manner that the direction of a combined positioning force and the direction of a combined pressing force lie on substantially the same axis.

Below, a description shall be given concerning a case in which the first example is applied to grip the workpiece 12.

Returning to FIG. 1, in the controller 58 that constitutes the control mechanism 74, the operation input unit 66 comprises operating buttons or a keyboard or the like operated by the user, by which the user can input the position of the axial center 80, and the size and weight of the workpiece 12, etc. The input information is stored in the storage unit 68.

In the case that a detection result indicative of the gripping force is input to the controller 58 from the load cell 50, the gripping force calculating unit 60 judges that a pressing force has been applied to the workpiece 12 from the gripping member 48 and that the workpiece 12 has been gripped, and determines the input detection result to be the gripping force that acts on the workpiece 12.

Further, the gripping force calculating unit 60 estimates the gripping force that acts on the workpiece 12 based on a pressure difference (P1–P2) between the first pressure P1 detected by the pressure sensor 30 and the second pressure P2 detected by the pressure sensor 32. Alternatively, the gripping force calculating unit 60 can estimate the gripping force that acts on the workpiece 12 based on a pressure difference (P3–P4) between the third pressure P3 detected by the pressure sensor 52 and the fourth pressure P4 detected by the pressure sensor 54.

Furthermore, based on the weight of the workpiece 12 that is stored in the storage unit 68, the gripping force calculating unit 60 calculates the magnitude of a suitable gripping force, and taking the calculated gripping force as a gripping force target value, determines a difference between the gripping force target value, and the gripping force detected by the load cell 50 or the estimated gripping force.

Since the load cell 50 is capable of directly detecting the gripping force that acts on the workpiece 12, in the case that high precision for the gripping force is required, the gripping force calculating unit 60 uses the gripping force on the workpiece 12 that is detected by the load cell 50. On the other hand, if high precision for the gripping force is not required, the gripping force calculating unit 60 calculates the gripping force using the pressure difference (P1–P2) and/or the pressure difference (P3–P4). Accordingly, the gripping force calculating unit 60 may change the calculation process for the gripping force depending on the precision needed for the gripping force.

The retaining position calculating unit 62 calculates the position of the gripping member 28 based on the position of the piston 18, which is detected by the length measuring sensor 34, and calculates the position of the gripping member 48 (i.e., the load cell 50 mounted thereon) based on the position of the piston 38, which is detected by the length measuring sensor 56.

Further, based on the size of the workpiece 12 and the position of the axial center 80, which are stored in the storage unit 68, the retaining position calculating unit 62 calculates a first position, which is a target position when the gripping member 28 positions the workpiece 12, and a second position when the gripping member 48 presses the workpiece 12.

If the size of the workpiece 12 is known beforehand, and the workpiece 12 is placed on the chuck main body 78 in a state such that the center position 86 of the workpiece 12 and the axial center 80 of the chuck main body 78 coincide with each other, the first position and the second position can be specified by the relationship between the installation locations of the first cylinder 14 and the second cylinder 16. Accordingly, the user may input the first position and the second position by operating the operation input unit 66, and the first position and the second position may be stored in the storage unit 68. In this case, it is unnecessary for a calculation process for calculating the first position and the second position to be carried out by the retaining position calculating unit 62.

The positional shift calculating unit 70 calculates an amount of positional shift of the center position 86 of the workpiece 12 with respect to the axial center 80 when the workpiece 12 is gripped by the gripping members 28, 48. More specifically, at the time that the workpiece 12 is gripped, based on the position of the gripping member 28 that is calculated by the retaining position calculating unit 62, and the position of (the load cell 50 that is mounted on) the gripping member 48, the center position 86 of the workpiece 12 is calculated, and an amount of positional shift between the calculated center position 86 and the position of the axial center 80 is calculated.

The control processor 64, based on processing results of the gripping force calculating unit 60, the retaining position calculating unit 62 and the positional shift calculating unit 70, outputs control signals responsive to the processing results, to the pressure fluid supply mechanisms 24, 44.

More specifically, in the event that the position of the gripping member 28, which is calculated by the retaining position calculating unit 62, does not reach the first position, the control processor 64 supplies a control signal to the pressure fluid supply mechanism 24. As a result, based on the control signal input thereto, the pressure fluid supply mechanism 24 adjusts the amount of pressure fluid supplied to the first cylinder 14, and thus controls the first pressure P1 and the second pressure P2, whereby a servo control is implemented to displace the gripping member 28 toward the workpiece 12 to the first position.

Further, when the gripping member 28 has reached the first position, the control processor 64 supplies a control signal to the pressure fluid supply mechanism 24, whereby pressure fluid is supplied from the pressure fluid supply mechanism 24 to the lock-up mechanism 36. Consequently, the lock-up mechanism 36 can fix and hold the piston rod 26.

On the other hand, in the case that the lock-up mechanism 36 is not used, the control processor 64 supplies a control signal to the pressure fluid supply mechanism 24, whereby the amount of pressure fluid supplied to the first cylinder 14 from the pressure fluid supply mechanism 24 is adjusted, and then the first pressure P1 and the second pressure P2 are controlled. Thus, a servo control is implemented to maintain the piston rod 26 at the present position.

Furthermore, in the event that the position of the gripping member 48, which is calculated by the retaining position calculating unit 62, does not reach the second position, the control processor 64 supplies a control signal to the pressure fluid supply mechanism 44. As a result, based on the control signal input thereto, the pressure fluid supply mechanism 44 adjusts the amount of pressure fluid supplied to the second cylinder 16, and thus controls the third pressure P3 and the fourth pressure P4, whereby a servo control is implemented to displace the gripping member 48 toward the workpiece 12.

Further, in the event that the position of the gripping member 48, which is calculated by the retaining position calculating unit 62, reaches the second position, the control processor 64 supplies a control signal to the pressure fluid supply mechanism 44, such that the gripping force calculated (specified) by the gripping force calculating unit 60 becomes the gripping force target value. As a result, based on the control signal input thereto, the pressure fluid supply mechanism 44 adjusts the amount of pressure fluid supplied to the second cylinder 16, and controls the third pressure P3 and the fourth pressure P4, whereby a servo control is implemented to cause the gripping member 48 to press the workpiece 12.

Furthermore, in the event that an amount of positional shift is calculated by the positional shift calculating unit 70, the control processor 64 supplies control signals to the pressure fluid supply mechanisms 24, 44, such that the amount of positional shift becomes zero. As a result, based on the control signals input thereto, the pressure fluid supply mechanisms 24, 44 adjust the amount of pressure fluid supplied to the first cylinder 14 and the second cylinder 16, and control the first through fourth pressures P1 through P4, whereby a servo control is implemented to displace the positions of the gripping members 28, 48 and thereby adjust the amount of positional shift to zero.

The display device 72 is a display monitor for displaying the detection results of the sensors 30, 32, 34, 52, 54, 56 and the load cell 50, the respective processing results of the controller 58, and information, etc., input by the user operating the operation input unit 66.

Operations of the Present Embodiment

The chucking device 10 according to the present embodiment is constructed basically as described above. Next, operations (a chucking method for the machine tool 76) will be described below with reference to FIGS. 5 through 8. In describing such operations, as necessary, reference may also be made to FIGS. 1 through 4.

With the chucking device 10, prior to carrying out such operations, a workpiece 12 is placed thereon in the vicinity of the axial center 80 of the chuck main body 78. In this case, as will be described in detail later, since the workpiece 12 is gripped at the position of the axial center 80, in a state in which the axial center 80 and the center position 86 of the workpiece 12 are made to coincide through operation of the chucking device 10, the workpiece 12 may initially be placed at a predetermined position in the vicinity of the axial center 80. Further, the user operates the operation input unit 66 to input various information concerning the position of the axial center 80, and the size and weight of the workpiece 12, etc. The input information is stored in the storage unit 68.

In addition, at time t0, the control processor 64 of the controller 58 initiates output of a control signal to command positioning of the workpiece 12 with respect to the pressure fluid supply mechanism 24, whereby a servo control is implemented to supply pressure fluid to the first cylinder 14 from the pressure fluid supply mechanism 24.

Figure 6:
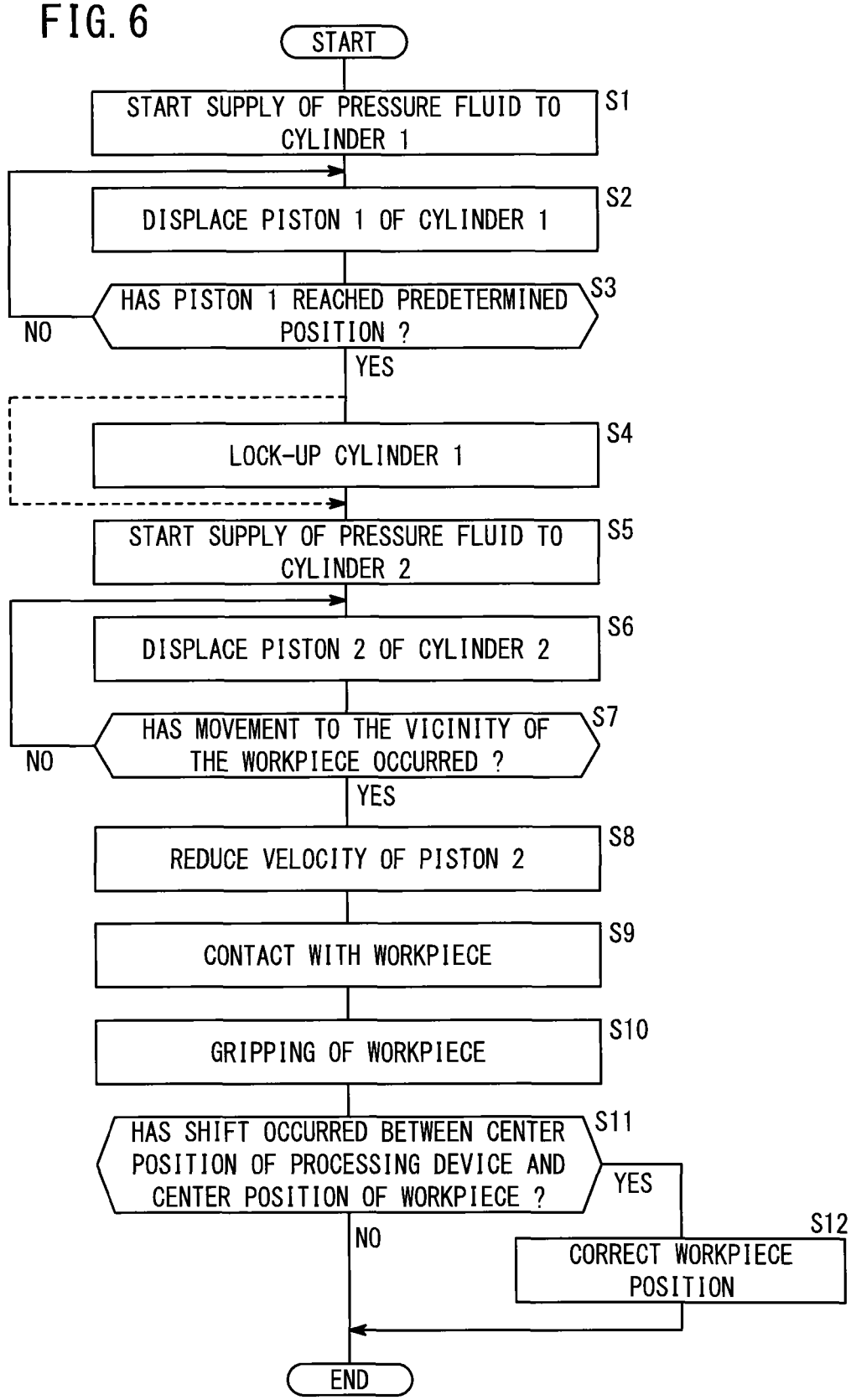
FIG. 6 is a flowchart showing operations of the chucking device of FIG. 1.

Consequently, in step S1 of FIG. 6, based on the control signal input thereto, the pressure fluid supply mechanism 24 initiates supply of pressure fluid to the first pressure chamber 20 of the first cylinder 14 (cylinder 1), together with discharging pressure fluid to the exterior from the second pressure chamber 22.

Thereafter, at time t1, when the pressure difference (P1−P2) between the first pressure P1 of the first pressure chamber 20 and the second pressure P2 of the second pressure chamber 22 exceeds a predetermined pressure, the piston 18 (piston 1) begins to be displaced in the X2 direction (step S2). As a result, the piston rod 26, which is connected to the piston 18, and the gripping member 28 are displaced in the X2 direction toward the axial center 80 and the workpiece 12.

Further, since the pressure sensor 30 sequentially detects the first pressure P1 and outputs the detected value thereof to the controller 58, and the pressure sensor 32 sequentially detects the second pressure P2 and outputs the detected value thereof to the controller 58, the gripping force calculating unit 60 is capable of sequentially calculating the pressure difference (P1−P2) between the first pressure P1 and the second pressure P2.

In this case, the length measuring sensor 34 sequentially detects the position of the piston 18 and outputs the detected position to the controller 58. Therefore, the retaining position calculating unit 62 sequentially calculates the position of the gripping member 28 based on the detected position of the piston 18, and during positioning of the workpiece 12, is capable of calculating the difference between the calculated position of the gripping member 28 and the first position.

Figure 7:
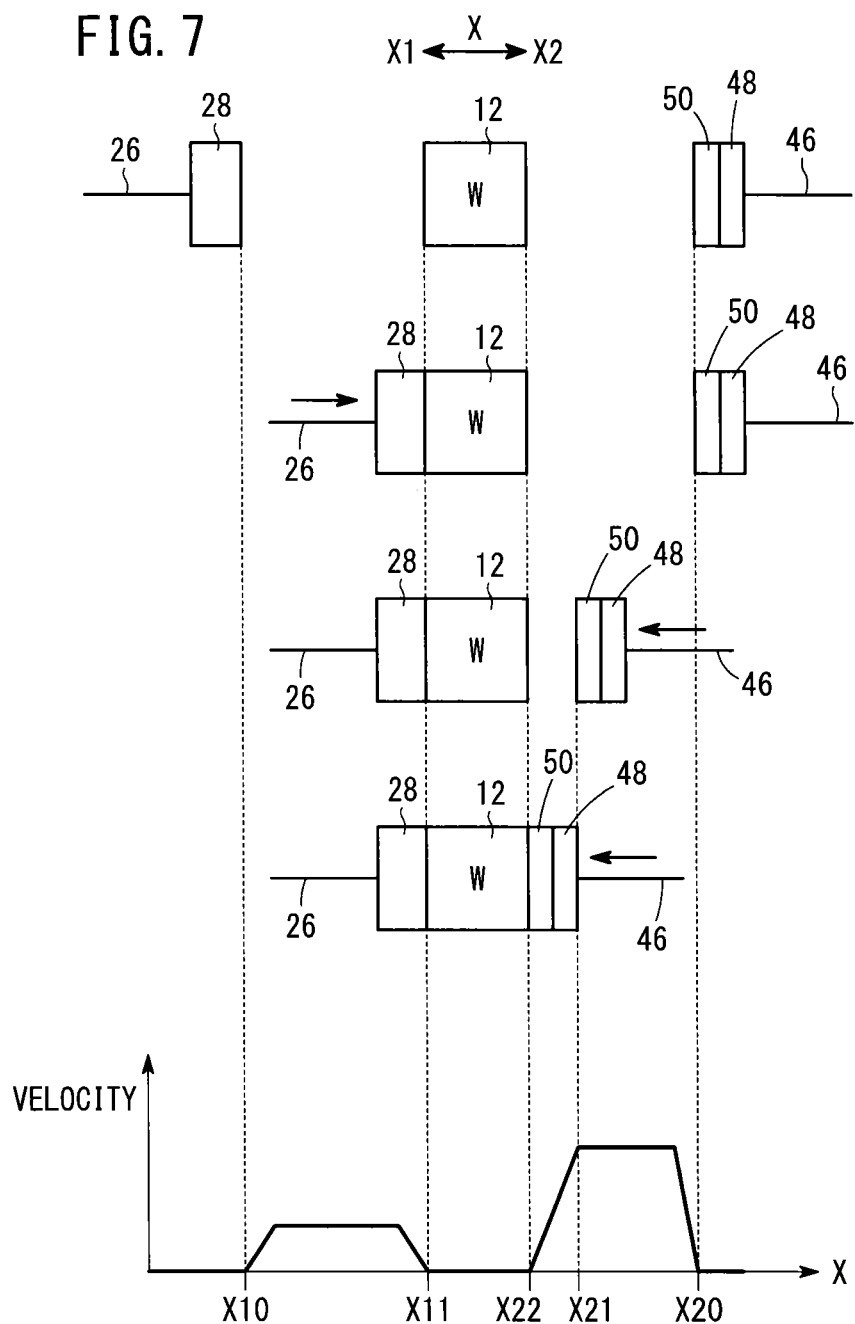
FIG. 7 is a schematic diagram in which a gripping operation of a workpiece is illustrated.

Consequently, as shown in FIG. 7, if the initial position of the gripping member 28 (i.e., the position from time t0 to time t1) is represented by X10, whereas the first position that serves as a target position upon positioning of the workpiece 12 is represented by X11, the control processor 64 is capable of displacing the piston 18, the piston rod 26, and the gripping member 28 at a comparatively high velocity in the X2 direction, until the position of the gripping member 28, which is calculated by the retaining position calculating unit 62, reaches a predetermined position in the vicinity of the first position X11.

Thereafter, when the gripping member 28 reaches the predetermined position, the control processor 64 gradually reduces the velocity of the piston 18, the piston rod 26, and the gripping member 28, from the predetermined position up to the first position X11.

Figure 5:
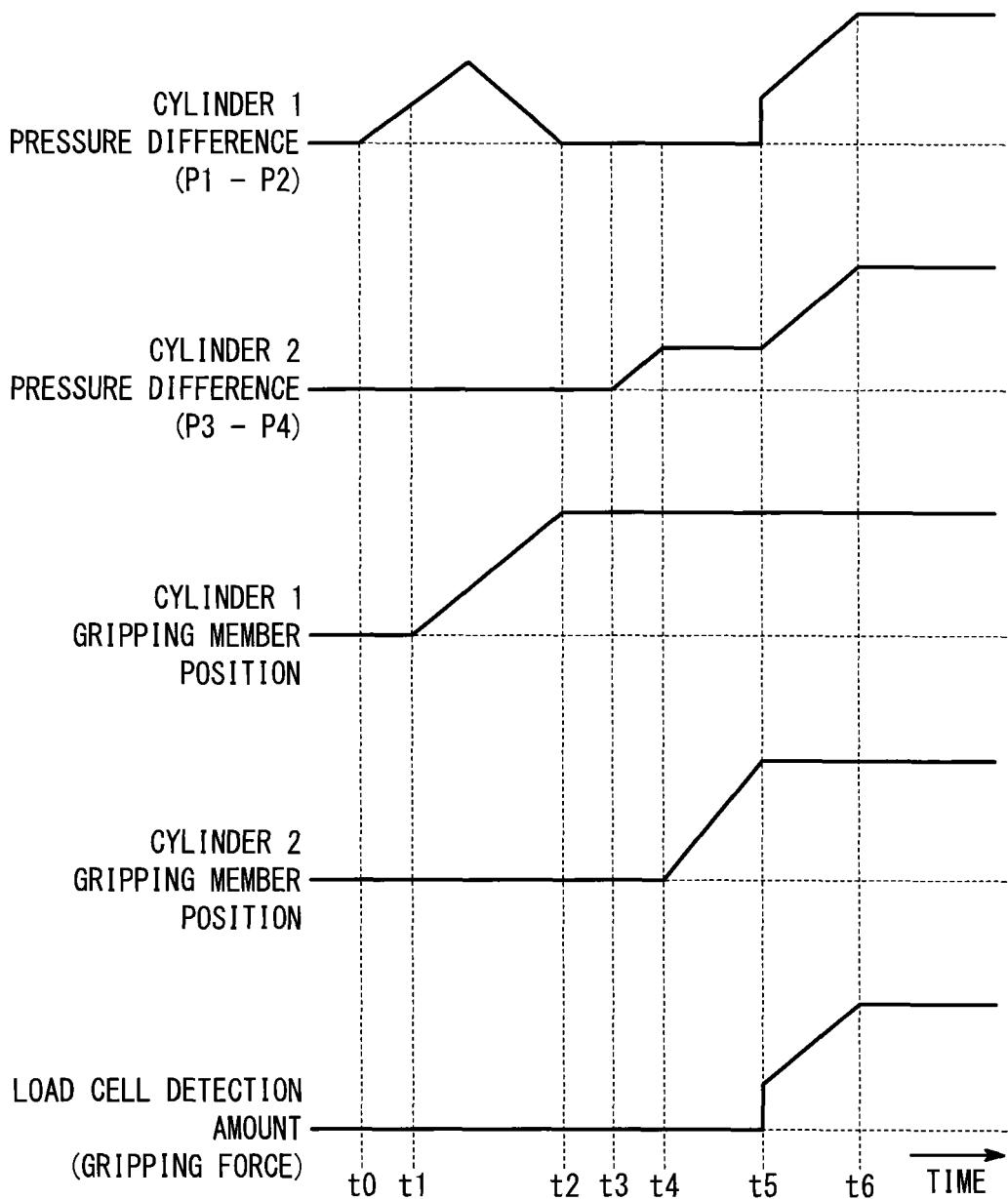
FIG. 5 is a timing chart showing operations of the chucking device of FIG. 1.

For this reason, as shown in FIG. 5, in a time period from time t1 to time t2, the control processor 64 outputs a control signal to the pressure fluid supply mechanism 24 in order to implement a servo control such that the pressure difference (P1−P2) becomes larger over time until the position of the gripping member 28 reaches the predetermined position, whereas, when the gripping member 28 reaches the predetermined position, the control processor 64 outputs a control signal to the pressure fluid supply mechanism 24 in order to implement a servo control such that the pressure difference (P1−P2) becomes smaller over time.

As a result, when the gripping member 28 reaches the first position X11 (step S3: YES), the pressure difference (P1−P2) becomes substantially zero and the velocity of the gripping member 28 becomes substantially zero, so that the gripping member 28 can come into contact lightly (softly) against the workpiece 12, and the workpiece 12 can be positioned. Thus, shocks applied to the workpiece 12 during positioning thereof can be suppressed.

Further, since the gripping member 28 contacts the workpiece 12 with the velocity thereof becoming zero, the control processor 64 can judge that the workpiece 12 has been positioned when the velocity becomes zero. The aforementioned velocity may be calculated, for example, as a time rate of change of (the position of the gripping member 28 corresponding to) the position of the piston 18, which is detected by the length measuring sensor 34.

In this manner, the gripping member 28 reaches the first position X11 and positions the workpiece 12. Then, the control processor 64 outputs a control signal with respect to the pressure fluid supply mechanism 24 for activating the lock-up mechanism 36. Consequently, based on the control signal input thereto, the pressure fluid supply mechanism 24 supplies pressure fluid to the lock-up mechanism 36. As a result, in step S4, the lock-up mechanism 36 fixes and holds the piston rod 26, and is capable of maintaining the workpiece 12 in a positioned state at the first position X11 by the gripping member 28.

In the case that the lock-up mechanism 36 is not provided, or if the lock-up mechanism 36 is not used, as shown by the dashed line in FIG. 6, the control processor 64 may output a control signal to the pressure fluid supply mechanism 24 in order to implement a servo control to maintain the position of the gripping member 28 at the first position X11. As a result, based on the control signal input thereto, the pressure fluid supply mechanism 24 adjusts the amount of pressure fluid supplied to the first cylinder 14, and controls the first pressure P1 and the second pressure P2, whereby the position of the gripping member 28 can be maintained at the first position X11.

Next, at time t3, the control processor 64 initiates output of a control signal to the pressure fluid supply mechanism 44 to command gripping of the workpiece 12, whereby a servo control is implemented to supply pressure fluid to the second cylinder 16 (cylinder 2) from the pressure fluid supply mechanism 44.

Consequently, in step S5, based on the control signal input thereto, the pressure fluid supply mechanism 44 initiates supply of pressure fluid to the third pressure chamber 40 of the second cylinder 16, together with discharging pressure fluid to the exterior from the fourth pressure chamber 42.

Thereafter, at time t4, when the pressure difference (P3−P4) between the third pressure P3 of the third pressure chamber 40 and the fourth pressure P4 of the fourth pressure chamber 42 exceeds a predetermined pressure, the piston 38 begins to be displaced in the X1 direction (step S6). As a result, the piston rod 46 connected to the piston 38, the gripping member 48, and the load cell 50 are displaced in the X1 direction toward the axial center 80 and the workpiece 12.

In this case as well, since the pressure sensor 52 sequentially detects the third pressure P3 and outputs the detected value thereof to the controller 58, and the pressure sensor 54 sequentially detects the fourth pressure P4 and outputs the detected value thereof to the controller 58, the gripping force calculating unit 60 is capable of sequentially calculating the pressure difference (P3−P4) between the third pressure P3 and the fourth pressure P4.

Since the length measuring sensor 56 sequentially detects the position of the piston 38 and outputs the value thereof to the controller 58, the retaining position calculating unit 62 can sequentially calculate the position of the gripping member 48 and the load cell 50 based on the detected position of the piston 38, and is capable of calculating the difference between the calculated position of the gripping member 48 and the load cell 50, and the second position at the time of pressing of the workpiece 12.

If the initial position of the gripping member 48 and the load cell 50 (i.e., the position from time t0 to time t4) is represented by X20, whereas the second position is represented by X22, the control processor 64 displaces the piston 38, the piston rod 46, the gripping member 48, and the load cell 50 at a comparatively high velocity in the X1 direction, until the position of the gripping member 48 and the load cell 50, which is calculated by the retaining position calculating unit 62, reaches a predetermined position X21 in the vicinity of the second position X22.

Thereafter, when the gripping member 48 and the load cell 50 reach the predetermined position X21 (step S7: YES), the control processor 64 gradually reduces the velocity of the piston 38, the piston rod 46, the gripping member 48, and the load cell 50 from the position X21 up to the second position X22 in step S8.

For this reason, as shown in FIG. 5, in a time period from time t4 to time t5, the control processor 64 supplies a control signal to the pressure fluid supply mechanism 44, so as to maintain the pressure difference (P3−P4) at a fixed value. As a result, in step S9, at time t5, the gripping member 48 and the load cell 50 arrive at the second position X22 at a velocity of substantially zero, and come into contact lightly (softly) against the workpiece 12. Thus, shocks applied to the workpiece 12 upon contact therewith can be suppressed.

Further, since the gripping member 48 and the load cell 50 contact the workpiece 12 with the velocity thereof becoming zero, the control processor 64, for example, may judge that the workpiece 12 has been properly positioned when the rate of change in (the position of the gripping member 48 and the load cell 50 corresponding to) the position of the piston 38, which is detected by the length measuring sensor 56, becomes zero.

Based on the weight of the workpiece 12 that is stored in the storage unit 68, the gripping force calculating unit 60 calculates a suitable gripping force with respect to the workpiece 12 as a gripping force target value. Further, when the workpiece 12 is contacted, the load cell 50 sequentially detects, as a gripping force acting on the workpiece 12, the pressing force at the time that the gripping member 48 presses the workpiece 12, and outputs the value thereof to the controller 58.

Thus, the gripping force calculating unit 60 calculates the difference between the gripping force target value and the gripping force detected by the load cell 50. The control processor 64 supplies a control signal to the pressure fluid supply mechanism 44, such that the gripping member 48 and the load cell 50 press the workpiece 12 until the difference between the gripping force and the gripping force target value becomes zero, or more specifically, until the gripping force with respect to the workpiece 12 reaches the gripping force target value.

Consequently, based on the control signal input thereto, the pressure fluid supply mechanism 44 supplies pressure fluid to the third pressure chamber 40. As a result, in a time period from time t5 to time t6, the pressure difference (P3−P4) increases over time, so that the gripping member 48 and the load cell 50 continue pressing the workpiece 12. Therefore, the gripping force detected by the load cell 50 increases over time.

On the other hand, the gripping force (pressing force) from the gripping member 48 and the load cell 50 is transmitted to the gripping member 28, the piston rod 26, and the piston 18 through the workpiece 12. In this case, although the pressing force produces a disturbance (external force) with respect to the first cylinder 14, since the piston rod 26 is fixed and held by the lock-up mechanism 36, the influence of such a disturbance (i.e., positional shifting of the workpiece 12 caused by displacement of the piston rod 26) can be suppressed.

Further, in order to prevent variations in the position of the gripping member 28 caused by the pressing force transmitted to the gripping member 28, the pressure fluid supply mechanism 24 adjusts the first pressure P1 and the second pressure P2, so that a reactive force with respect to the pressing force is generated in the gripping member 28. As a result, the pressure difference (P1−P2) also increases over time.

Thereafter, at time t6, by the gripping force reaching the gripping force target value, in step S10, the workpiece 12 is gripped at an appropriate gripping force by the gripping members 28, 48. Further, the control processor 64 supplies predetermined control signals to the pressure fluid supply mechanisms 24, 44, so as to maintain the state in which the workpiece 12 is gripped with the appropriate gripping force (gripping force target value) in the first position X11 and the second position X22. Consequently, the pressure fluid supply mechanisms 24, 44 carry out a servo control in order to control the first through fourth pressures P1 through P4, by adjusting the amount of pressure fluid supplied to the first cylinder 14 and the second cylinder 16 so as to maintain the gripped state of the workpiece 12.

Incidentally, in the event that the workpiece 12 is gripped by the gripping members 28, 48, the retaining position calculating unit 62 can calculate, as the center position 86 of the workpiece 12, a median center point between the respective calculated positions of the gripping members 28, 48. Thus, in step S11, the positional shift calculating unit 70 calculates the amount of positional shift between the calculated center position 86, which was calculated by the retaining position calculating unit 62, and the position of the axial center 80.

In addition, if the positional shift amount resides within a predetermined value (i.e., is less than or equal to the predetermined value), then in step S11, the control processor 64 judges that positional shifting is not occurring between the axial center 80 and the center position 86 (step S11: NO), and the servo control continues to be carried out to maintain the aforementioned gripped state of the workpiece 12.

On the other hand, if the positional shift amount exceeds the predetermined value, then in step S11, the control processor 64 judges that a positional shift of the center position 86 with respect to the axial center 80 has occurred (step S11: YES), and in step S12, a correction process is implemented to automatically correct the center position 86 to the position of the axial center 80.

Figure 8:
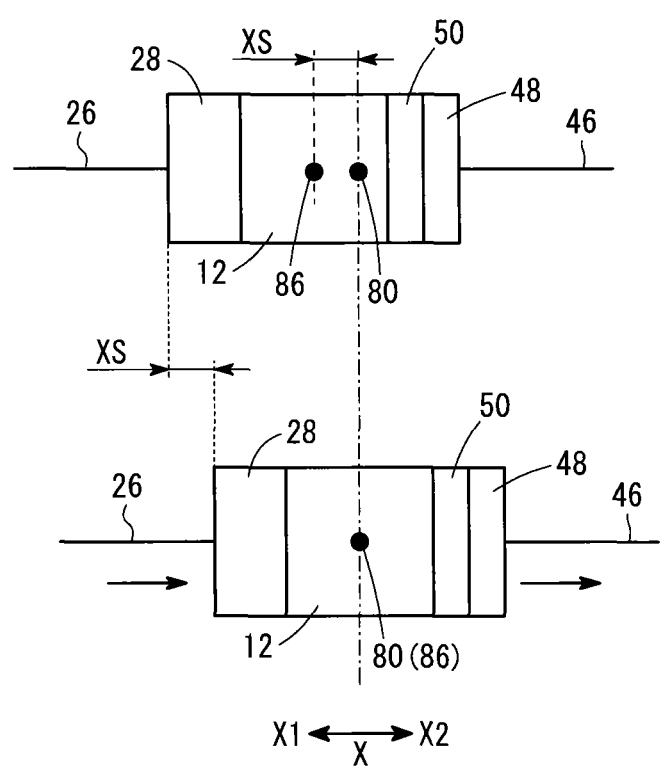
FIG. 8 is a schematic diagram illustrating the correction of positional shifting of a workpiece, in the case that positional shifting occurs between the axial center of a chuck main body and the center position of the workpiece.

As shown in FIG. 8, if the amount of positional shift between the center position 86 and the axial center 80 is represented by XS, in step S12, the control processor 64 outputs a control signal to the pressure fluid supply mechanism 24 in order to release the fixed and held state of the piston rod 26 by the lock-up mechanism 36. Based on the control signal input thereto, the pressure fluid supply mechanism 24 terminates supply of the pressure fluid to the lock-up mechanism 36, and the fixed and held state of the piston rod 26 is released.

Next, the control processor 64 outputs a control signal to the pressure fluid supply mechanism 24 for displacing the gripping member 28 by the positional shift amount XS, together with outputting a control signal to the pressure fluid supply mechanism 44 for displacing the gripping member 48 and the load cell 50 by the positional shift amount XS. Consequently, based on the control signal input thereto, the pressure fluid supply mechanism 24 supplies pressure fluid to the first cylinder 14, whereby the piston 18, the piston rod 26, and the gripping member 28 are displaced in the X direction by the positional shift amount XS. On the other hand, based on the control signal input thereto, the pressure fluid supply mechanism 44 supplies pressure fluid to the second cylinder 16, whereby the piston 38, the piston rod 46, the gripping member 48, and the load cell 50 are displaced in the X direction by the positional shift amount XS.

Accordingly, the center position 86 can be corrected automatically to the position of the axial center 80, and the workpiece 12 can be gripped at the position of the axial center 80. After the piston 18, the piston rod 26, and the gripping member 28 have been displaced in the X direction by the positional shift amount XS, it is a matter of course that the process of step S4 may be carried out again, so that the piston rod 26 can be fixed and held by the lock-up mechanism 36.

Advantages of the Present Embodiment

As has been described above, in accordance with the chucking device 10 and the chucking method for a machine tool 76 according to the present embodiment, the workpiece 12 is positioned by the first cylinder 14, and the positioned workpiece 12 is pressed by the second cylinder 16, whereby the workpiece 12, which has been placed properly on the chuck main body 78, is gripped. In addition, based on the position of the piston 18, which is detected by the length measuring sensor 34, and the position of the piston 38, which is detected by the length measuring sensor 56, the control mechanism 74 controls the first cylinder 14 and the second cylinder 16, and the workpiece 12 is gripped by the gripping member 28, which is connected to the piston rod 26, and the gripping member 48, which is connected to the piston rod 46, at a predetermined position (the position of the axial center 80) of the chuck main body 78.

Owing thereto, the workpiece 12 can be gripped without the occurrence of positional shifting of the workpiece 12. Further, even if variations exist in the shapes of workpieces 12, or if the center position 86 of the workpiece 12 becomes shifted with respect to the axial center 80 of the chuck main body 78, the workpiece 12 can be gripped under a condition in which the center position 86 of the workpiece 12 substantially coincides with the axial center 80.

Further, based on the position of the piston 18, which is detected by the length measuring sensor 34, the pressure fluid supply mechanism 24 that makes up the control mechanism 74 displaces the piston 18, the piston rod 26, and the gripping member 28 toward the axial center 80. On the other hand, based on the position of the piston 38, which is detected by the length measuring sensor 56, the pressure fluid supply mechanism 44 displaces the piston 38, the piston rod 46, the gripping member 48, and the load cell 50 toward the axial center 80.

Consequently, the workpiece 12 can be gripped at the position of the axial center 80, without the occurrence of positional shifting of the workpiece 12. Further, even if variations exist in the shapes, etc. of workpieces 12, or if the center position 86 of the workpiece 12 becomes shifted with respect to the axial center 80, the workpiece 12 can be gripped under a condition in which the center position 86 of the workpiece 12 coincides with the axial center 80.

Based on the respective positions of the pistons 18, 38 that are detected, the positional shift calculating unit 70 of the controller 58 calculates an amount of positional shift XS between the axial center 80 and the center position 86 of the workpiece 12, which is gripped by the gripping members 28, 48. As a result, the pressure fluid supply mechanism 24 displaces the piston rod 26, etc. based on the positional shift amount XS, and the pressure fluid supply mechanism 44 displaces the piston rod 46, etc. based on the positional shift amount XS, whereby the center position 86 of the workpiece 12 is corrected to the axial center 80.

In this manner, even if variations exist in the shapes, etc. of the workpieces 12, or if the workpiece 12 is placed in a condition where the center position 86 of the workpiece 12 is shifted with respect to the axial center 80, since the center position 86 of the workpiece 12 is corrected automatically to the axial center 80 such that the amount of positional shift XS becomes zero, the workpiece 12 can reliably be gripped at the position of the axial center 80.

The retaining position calculating unit 62 calculates the position of the gripping member 28 based on the detected position of the piston 18, and calculates the position of the gripping member 48 and the load cell 50 based on the detected position of the piston 38. Therefore, if the pressure fluid supply mechanism 24 displaces the gripping member 28, etc. toward the axial center 80 until the calculated position of the gripping member 28 reaches the first position X11, the workpiece 12 can be positioned at the first position X11. Further, if the pressure fluid supply mechanism 44 displaces the gripping member 48 and the load cell 50, etc. toward the axial center 80 until the calculated position of the gripping member 48 and the load cell 50 reaches the second position X22 at which the workpiece 12 is pressed, the workpiece 12 can be pressed at the second position X22.

Accordingly, the workpiece 12 can be gripped reliably at the position of the axial center 80. Further, in the case that the size of the workpiece 12 is known beforehand, and the workpiece 12 is gripped at the position of the axial center 80, the first position X11 and the second position X22 can be specified beforehand from the size of the workpiece 12 and the position of the axial center 80. As a result, the gripping member 28, etc., can easily be displaced to the first position X11, and the gripping member 48 and the load cell 50, etc., can easily be displaced to the second position X22.

Further, in the case that the workpiece 12 is placed on the chuck main body 78 such that the center position 86 of the workpiece 12 substantially coincides with the axial center 80, the retaining position calculating unit 62 may calculate the first position X11 and the second position X22 based on the size of the workpiece 12.

In addition, the pressure fluid supply mechanism 24 displaces the gripping member 28, etc., toward the axial center 80 while adjusting a velocity of the gripping member 28, etc., based on the difference between the first position X11 and the position of the gripping member 28. Further, based on the difference between the second position X22 and the position of the gripping member 48 and the load cell 50, the pressure fluid supply mechanism 44 displaces the gripping member 48 and the load cell 50, etc., toward the axial center 80 while adjusting the velocity of the gripping member 48 and the load cell 50, etc.

Consequently, at the side of the first cylinder 14, after the gripping member 28 has been displaced at high velocity to a location in the vicinity of the workpiece 12, the gripping member 28 is reduced in velocity just before the workpiece 12, and is brought into contact with the workpiece 12 at a velocity of substantially zero. As a result, the gripping member 28 can be brought into contact lightly (softly) against the workpiece 12 at the first position X11, so that shocks to the workpiece 12 can be suppressed when the workpiece 12 is positioned.

Further, at the side of the second cylinder 16, after the gripping member 48 and the load cell 50 have been displaced at high velocity to a location in the vicinity of the workpiece 12, the gripping member 48 and the load cell 50 are reduced in velocity at the position X21 just before the workpiece 12, and are brought into contact with the workpiece 12 at a velocity of substantially zero. As a result, the gripping member 48 and the load cell 50 can be brought into contact lightly (softly) against the workpiece 12 at the second position X22, so that shocks to the workpiece 12 can be suppressed when the workpiece 12 is gripped.

Further, when the position of the gripping member 28 reaches the first position X11, the control mechanism 74 causes the piston rod 26 to be fixed and held by the lock-up mechanism 36. Owing thereto, when the workpiece 12 is gripped, even if a pressing force (gripping force) from the gripping member 48 and the load cell 50 is transmitted to the gripping member 28 through the workpiece 12, unwanted displacement of the piston rod 26 by the pressing force can be prevented.

More specifically, the pressing force behaves as an external force (disturbance) when the gripping member 28 is positioning the workpiece 12. Accordingly, by the lock-up mechanism 36 fixing and holding the piston rod 26, the influence of such disturbances can be avoided.

To explain in greater detail, the pressure fluid supply mechanisms 24, 44 implement a servo control for controlling the first through fourth pressures P1 through P4, by adjusting the amount of pressure fluid supplied to the first cylinder 14 and the second cylinder 16. For this reason, in the case that the aforementioned external force is applied to the gripping member 28, by the pressure fluid supply mechanism 24 implementing a servo control in response to the external force, the first pressure P1 and the second pressure P2 are varied, and there is a possibility that the gripping member 28 will be displaced. In order to prevent such a possibility, by the lock-up mechanism 36 gripping and holding the piston rod 26, variations of the first pressure P1 and the second pressure P2 are suppressed, so that a change in the position of the gripping member 28 can be avoided.

Further, in the case that a machine tool 76 carries out laser processing with respect to the workpiece 12, there is a possibility for the first pressure P1 and the second pressure P2 to be varied due to heat generated by the laser processing. In this case as well, as a result of the piston rod 26 being gripped and held by the lock-up mechanism 36, a change in the position of the gripping member 28 caused by variations of the first pressure P1 and the second pressure P2 can be prevented.

Further, after the position of the gripping member 28 has reached the first position X11, the pressure fluid supply mechanism 24 may carry out a servo control to maintain the position of the gripping member 28 at the first position X11. More specifically, in the case that the lock-up mechanism 36 is not provided together with the first cylinder 14 or in the case that the lock-up mechanism 36 is not operated, by maintaining the position of the gripping member 28 at the first position X11 through a servo control, the positioned state of the workpiece 12 by the first cylinder 14 can be retained.

Further, by installing the load cell 50 on the gripping member 48 and directly detecting the gripping force on the workpiece 12, the degree to which the gripping force is being applied with respect to the workpiece 12 can be detected with high precision. Accordingly, with the control mechanism 74, by the pressure fluid supply mechanisms 24, 44 controlling the first cylinder 14 and the second cylinder 16 based on the detected gripping force, the workpiece 12 can be gripped with an appropriate gripping force by the gripping members 28, 48.

Moreover, instead of being installed on the gripping member 48, the load cell 50 may be installed on the gripping member 28, or load cells 50 may be installed on both of the gripping members 28, 48.

In the case that the load cell 50 is installed on the gripping member 28 instead of the gripping member 48, the load cell 50 can detect, as a gripping force, the pressing force that is transmitted from the gripping member 48 to the gripping member 28 through the workpiece 12. In this case as well, the aforementioned effects can be obtained.

Further, in the case that load cells 50 are installed on both of the gripping members 28, 48, even in the case that the workpiece 12 is off-centered due to the shape of the workpiece 12 or the like, the gripping force applied to the workpiece 12 can be detected.

Further, in the present embodiment, instead of detecting the gripping force by the load cell 50, the gripping force calculating unit 60 may calculate the gripping force applied to the workpiece 12, based on the first pressure P1 detected by the pressure sensor 30 and the second pressure P2 detected by the pressure sensor 32. Alternatively, the gripping force calculating unit 60 may calculate the gripping force with respect to the workpiece 12, based on the third pressure P3 detected by the pressure sensor 52 and the fourth pressure P4 detected by the pressure sensor 54.

More specifically, in the case that high precision in respect to the gripping force is not required, the gripping force may be estimated based on the first pressure P1 and the second pressure P2 and/or the third pressure P3 and the fourth pressure P4. In this case as well, by the pressure fluid supply mechanisms 24, 44 controlling the first cylinder 14 and the second cylinder 16 based on the estimated gripping force, the workpiece 12 can be gripped with an appropriate gripping force.

Further, the gripping force calculating unit 60 may calculate, as a gripping force target value, a gripping force corresponding to the weight of the workpiece 12. In this case, the pressure fluid supply mechanism 24 may control the first pressure P1 and the second pressure P2, such that the calculated gripping force becomes the gripping force target value. Further, the pressure fluid supply mechanism 44 may control the third pressure P3 and the fourth pressure P4, such that the calculated gripping force becomes the gripping force target value.

In this manner, in a case that the first through fourth pressures P1 through P4 are controlled based on the weight of the workpiece 12, and the gripping members 28, 48 are displaced, application of an excessive gripping force with respect to a lightweight workpiece 12, or application of an insufficient gripping force with respect to a heavy workpiece 12 can be prevented.

Further, with the present embodiment, the first cylinder 14 and the second cylinder 16 may be attached to the chuck main body 78 in such a way that the direction of a positioning force that acts on the workpiece 12 from the gripping member 28, and the direction of a pressing force that acts on the workpiece 12 from the gripping member 48 lie on substantially the same axis. Consequently, since the positioning force and the pressing force are applied along the same single axis with respect to the workpiece 12, positional shifting of the workpiece 12 is prevented while the workpiece 12 can also be gripped highly efficiently.

More specifically, in the case of the first example, the first cylinder 14 and the second cylinder 16 are attached to the chuck main body 78 in confronting relation to each other with the axial center 80 sandwiched therebetween. Therefore, positional shifting of the workpiece 12 can be prevented, and the workpiece 12 can be gripped reliably at the position of the axial center 80.

Further, in the case of the second example, one first cylinder 14 and one second cylinder 16, which are disposed in confronting relation sandwiching the axial center 80 therebetween, are paired, and plural pairs of the cylinders are attached to the chuck main body 78 at a predetermined angular interval in a radiating manner with respect to the axial center 80. Accordingly, positional shifting of the workpiece 12 is certainly prevented, while the workpiece 12 can be gripped reliably at the position of the axial center 80.

Furthermore, in the third example, at least three of the first cylinders 14 and the second cylinder 16 in total are attached at a predetermined angular interval in a radiating manner with respect to the axial center 80, and the first cylinders 14 and the second cylinder 16 are attached to the chuck main body 78 in such a manner that the direction of a combined positioning force and the direction of a combined pressing force lie on substantially the same axis. In this manner, even if the first cylinder 14 and the second cylinder 16 are not disposed in confronting relation sandwiching the axial center 80 therebetween, as long as the directions of the combined positioning force and the combined pressing force are arranged substantially on the same single axis, positional shifting of the workpiece 12 can be prevented, and the workpiece 12 can be gripped at the position of the axial center 80.

Modification of the Present Embodiment

Next, a modification of the chucking device 10 will be described with reference to FIG. 9. Constituent features of the modification, which are the same as those shown in FIG. 1, are denoted using the same reference characters, and detailed description of such features is omitted.

Figure 9:
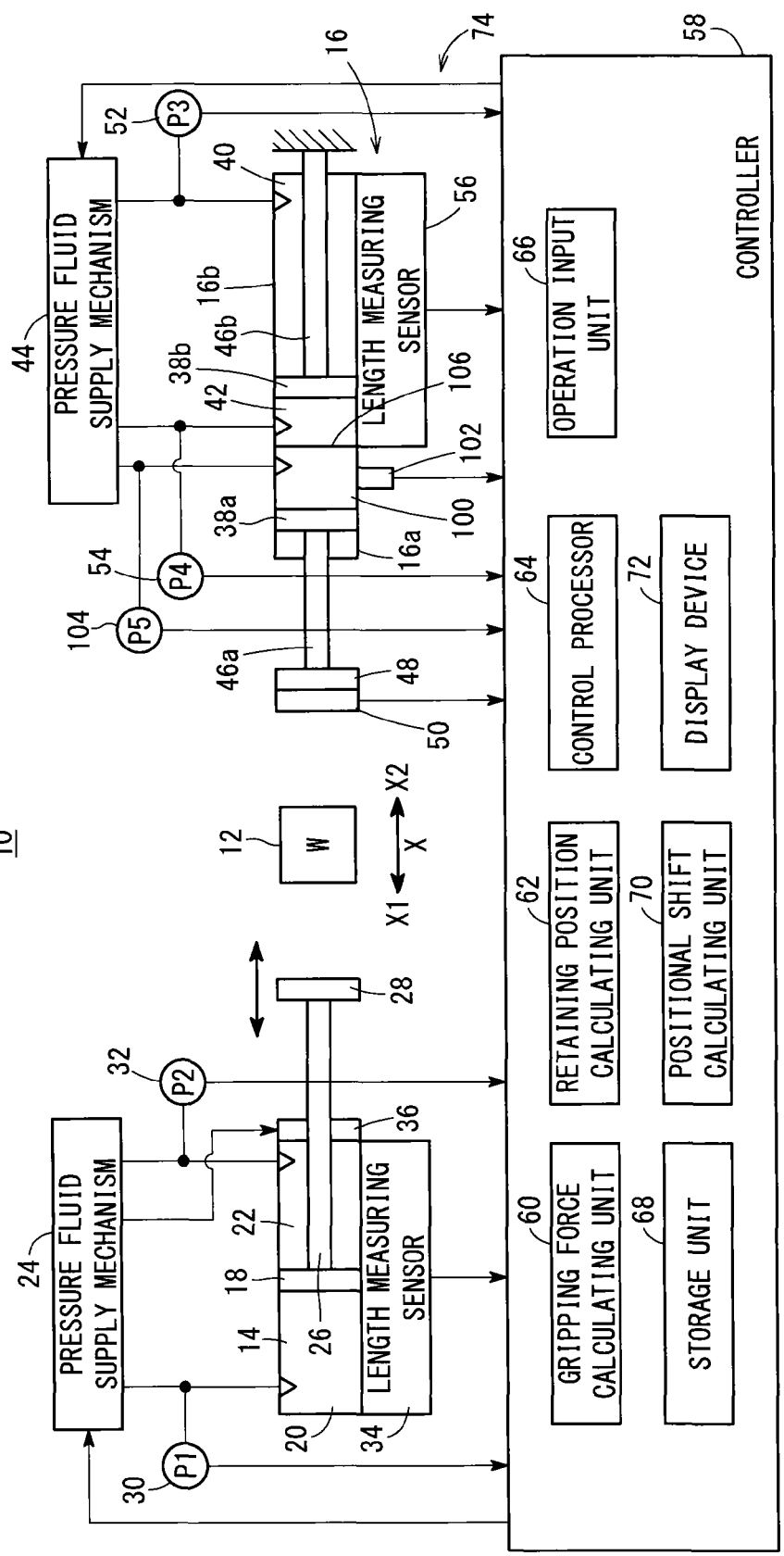
FIG. 9 is a configuration diagram of a chucking device according to a modification.

The modification shown in FIG. 9 differs from the structure of FIG. 1, in that the second cylinder 16 comprises a tandem type cylinder, which is constituted from two cylinder units 16a, 16b connected along the X direction of the arrows X1, X2.

In this case, in the cylinder unit 16a on the side in the X1 direction, a piston rod 46a is connected to a piston 38a, with the gripping member 48 and the load cell 50 being disposed on a distal end of the piston rod 46a. In the interior of the cylinder unit 16a, a fifth pressure chamber 100 is formed by the piston 38a. A position detecting sensor 102 that detects the position of the piston 38a is attached to the cylinder unit 16a. The pressure fluid supply mechanism 44 supplies pressure fluid to the fifth pressure chamber 100 at a fifth pressure P5, which is a predetermined fixed pressure. The fifth pressure P5 is detected by a pressure sensor 104.

On the other hand, in the cylinder unit 16b on the side in the X2 direction, a piston rod 46b is connected to a piston 38b. A distal end in the X2 direction of the piston rod 46b, for example, is fixed to the chuck main body 78. Further, the interior of the cylinder unit 16b is partitioned into the third pressure chamber 40 and the fourth pressure chamber 42 by the piston 38b. In this case, the length measuring sensor 56 detects the position of the piston 38b. The cylinder unit 16a and the cylinder unit 16b are separated by a wall 106.

In the modification, in a state in which the workpiece 12 is being positioned by the gripping member 28, a pressure fluid at the fifth pressure P5, which is a comparatively low pressure, is supplied to the fifth pressure chamber 100 from the pressure fluid supply mechanism 44.

In this case, due to a control signal being input from the control processor 64, when pressure fluid at the fourth pressure P4 is supplied to the fourth pressure chamber 42 from the pressure fluid supply mechanism 44, since the piston 38b and the piston rod 46b are fixed to the chuck main body 78, the second cylinder 16 is displaced in its entirety in the X1 direction.

In the case that the second cylinder 16 is displaced further as a whole in the X1 direction, whereby the gripping member 48 and the load cell 50 come into contact with the workpiece 12, since the fifth pressure P5 is a comparatively low pressure, the piston 38a, the piston rod 46a, the gripping member 48, and the load cell 50 receive and absorb the force from the workpiece 12, and are retracted integrally in the X2 direction. More specifically, since the fifth pressure P5 is a comparatively low pressure, after the gripping member 48 and the load cell 50 come into contact lightly (softly) against the workpiece 12, the force from the workpiece 12 is imparted to the gripping member 48 and the load cell 50, and the gripping member 48 and the load cell 50 are retracted in the X2 direction.

Additionally, in the case that the piston 38a is retracted to a position (the position of the wall 106) confronting the position detecting sensor 102, the position detecting sensor 102 detects a magnetic flux, which is generated from a non-illustrated magnet disposed on the piston 38a, and a detection signal, which indicates that the piston 38a has been retracted back to the position of the position detecting sensor 102, is output to the controller 58. Consequently, based on the detection signal input thereto, the control processor 64 is capable of grasping that the gripping member 48 and the load cell 50 have come into contact with the workpiece 12.

Next, the control processor 64 outputs, to the pressure fluid supply mechanism 44, a control signal for instructing the pressure fluid supply mechanism 44 to cause the gripping force acting on the workpiece 12 to reach the gripping force target value. Accordingly, based on the control signal input thereto, the pressure fluid supply mechanism 44 increases the supplied amount of pressure fluid to the fourth pressure chamber 42, thereby increasing the fourth pressure P4. Consequently, a pressing force corresponding to the fourth pressure P4 is applied to the workpiece 12 through the piston 38a, the piston rod 46a, the gripping member 48, and the load cell 50, and the workpiece 12 can be gripped by the gripping members 28, 48.

Thus, with the modification of FIG. 9, by using the tandem type second cylinder 16, shocks applied to the workpiece 12 upon contact therewith can be suppressed. Further, in the case that the tandem type second cylinder 16 is used, since the workpiece 12 is capable of being gripped, with the modification of FIG. 9, the same effects and advantages as the structure of FIG. 1 can be obtained.

The present invention is not limited to the embodiment described above, and various modified or additional structures may be adopted therein without deviating from the scope of the invention as set forth in the appended claims.

What is claimed is:

1. A chucking device for a machine tool for gripping a workpiece as a target object to be processed by the machine tool, comprising:
    a chuck main body;
    a first cylinder attached to the chuck main body and in which a first piston rod connected to a first piston is displaced in a direction toward the workpiece to thereby position the workpiece;
    a second cylinder attached to the chuck main body and in which a second piston rod connected to a second piston is displaced in a direction toward the workpiece to thereby press the positioned workpiece;
    a first position detecting sensor that detects a position of the first piston;
    a second position detecting sensor that detects a position of the second piston;
    a control mechanism that controls the first cylinder and the second cylinder based on the position of the first piston and the position of the second piston, which have been detected, such that the workpiece is gripped at a predetermined position of the chuck main body by the first piston rod and the second piston rod;
    a first cylinder controller that displaces the first piston rod by controlling the first cylinder;
    a second cylinder controller that displaces the second piston rod by controlling the second cylinder; and
    an end position calculating unit, which calculates a position of an end of the first piston rod based on the detected position of the first piston, and calculates a position of an end of the second piston rod based on the detected position of the second piston, wherein:
    the first piston rod is displaced toward an axial center of the chuck main body in accordance with a control performed by the first cylinder controller to thereby position the workpiece at a predetermined position on the chuck main body;
    the second piston rod is displaced toward the axial center of the chuck main body in accordance with a control performed by the second cylinder controller to thereby press the workpiece;
    the first cylinder controller displaces the first piston rod toward the axial center, until the calculated position of the end of the first piston rod reaches a first position configured to position the workpiece; and
    the second cylinder controller displaces the second piston rod toward the axial center, until the calculated position of the end of the second piston rod reaches a second position configured to press the workpiece.

2. The chucking device for a machine tool according to claim 1, the control mechanism further comprising a positional shift calculating unit, which calculates an amount of positional shift between the axial center and a center position of the workpiece that is gripped by the first piston rod and the second piston rod, based on the position of the first piston and the position of the second piston, which have been detected, wherein the first cylinder controller displaces the first piston rod based on the amount of positional shift, and the second cylinder controller displaces the second piston rod based on the amount of positional shift, whereby the center position of the workpiece is corrected to the axial center.

3. The chucking device for a machine tool according to claim 1, wherein:

the first cylinder controller displaces the first piston rod toward the axial center while adjusting a velocity of the first piston rod, based on the first position and the position of the end of the first piston rod; and the second cylinder controller displaces the second piston rod toward the axial center while adjusting a velocity of the second piston rod, based on the second position and the position of the end of the second piston rod.

4. The chucking device for a machine tool according to claim 1, wherein the control mechanism further comprises a lock-up unit that fixes and holds the first piston rod when the position of the end of the first piston rod reaches the first position.

5. The chucking device for a machine tool according to claim 1, wherein the first cylinder controller maintains the position of the end of the first piston rod at the first position, after the position of the end has reached the first position.

6. The chucking device for a machine tool according to claim 1, wherein a gripping force detecting sensor, which detects a gripping force applied to the workpiece by the first piston rod and the second piston rod, is disposed on an end of the first piston rod that contacts the workpiece and/or an end of the second piston rod that contacts the workpiece.

7. The chucking device for a machine tool according to claim 1, wherein:

the first cylinder and the second cylinder are fluid pressure cylinders;

the first cylinder controller comprises a pressure fluid supply device that displaces the first piston rod by supplying a pressure fluid to the first cylinder; and the second cylinder controller comprises a pressure fluid supply device that displaces the second piston rod by supplying a pressure fluid to the second cylinder.

8. The chucking device for a machine tool according to claim 7, wherein:

a first pressure chamber and a second pressure chamber, which are separated by the first piston, are formed in an interior of the first cylinder;

a third pressure chamber and a fourth pressure chamber, which are separated by the second piston, are formed in an interior of the second cylinder, the chucking device for a machine tool further comprising:

a first pressure sensor that detects a first pressure of the first pressure chamber;

a second pressure sensor that detects a second pressure of the second pressure chamber;

a third pressure sensor that detects a third pressure of the third pressure chamber; and a fourth pressure sensor that detects a fourth pressure of the fourth pressure chamber, wherein the control mechanism further comprises a gripping force calculating unit that calculates a gripping force applied to the workpiece by the first piston rod and the second piston rod, based on the detected first pressure and the detected second pressure, and/or the detected third pressure and the detected fourth pressure.

9. The chucking device for a machine tool according to claim 8, wherein:

the gripping force calculating unit calculates, as a gripping force target value, a gripping force corresponding to a weight of the workpiece;

the first cylinder controller controls the first pressure and the second pressure such that the calculated gripping force becomes the gripping force target value; and the second cylinder controller controls the third pressure and the fourth pressure such that the calculated gripping force becomes the gripping force target value.

10. The chucking device for a machine tool according to claim 1, wherein the first cylinder and the second cylinder are attached to the chuck main body in such a way that a direction of a positioning force that acts on the workpiece from the first piston rod, and a direction of a pressing force that acts on the workpiece from the second piston rod lie on substantially the same axis.

11. The chucking device for a machine tool according to claim 10, wherein the first cylinder and the second cylinder are attached to the chuck main body in confronting relation to each other with the axial center sandwiched therebetween.

12. The chucking device for a machine tool according to claim 11, wherein, in a case that one first cylinder and one second cylinder, which are disposed in confronting relation to each other sandwiching the axial center therebetween, form one pair, plural pairs of the cylinders are attached to the chuck main body at a predetermined angular interval in a radiating manner with respect to the axial center.

13. The chucking device for a machine tool according to claim 11, wherein, in a case that at least three of the first cylinders and the second cylinders in total are attached at a predetermined angular interval in a radiating manner with respect to the axial center, the first cylinders and the second cylinders are attached to the chuck main body in such a manner that a direction of a combined positioning force and a direction of a combined pressing force lie on substantially the same axis.

14. A chucking method for a machine tool for gripping a workpiece as a target object to be processed by the machine tool, comprising:

a first step of displacing a first piston rod connected to a first piston of a first cylinder that is attached to a chuck main body, in a direction toward the workpiece to thereby position the workpiece, in a state in which the workpiece is placed on the chuck main body;

a second step of displacing a second piston rod connected to a second piston of a second cylinder that is attached to the chuck main body, in a direction toward the workpiece to thereby press the positioned workpiece;

a first cylinder controller that displaces the first piston rod by controlling the first cylinder;

a second cylinder controller that displaces the second piston rod by controlling the second cylinder; and an end position calculating unit, which calculates a position of an end of the first piston rod based on the detected position of the first piston, and calculates a position of an end of the second piston rod based on the detected position of the second piston, wherein:

the first piston rod is displaced toward an axial center of the chuck main body in accordance with a control performed by the first cylinder controller to thereby position the workpiece at a predetermined position on the chuck main body;

the second piston rod is displaced toward the axial center of the chuck main body in accordance with a control performed by the second cylinder controller to thereby press the workpiece;

the first cylinder controller displaces the first piston rod toward the axial center, until the calculated position of the end of the first piston rod reaches a first position configured to position the workpiece;

the second cylinder controller displaces the second piston rod toward the axial center, until the calculated position of the end of the second piston rod reaches a second position configured to press the workpiece; and in the second step, a control mechanism controls the first cylinder and the second cylinder based on a position of the first piston detected by a first position detecting sensor, and a position of the second piston detected by a second position detecting sensor, such that the workpiece is gripped at a predetermined position of the chuck main body by the first piston rod and the second piston rod.

* * * * *